United States Patent
Friedrich

(10) Patent No.: US 8,606,103 B2
(45) Date of Patent: Dec. 10, 2013

(54) METHOD AND A NETWORK FOR PROCESSING OF WAVELENGTH DIVISION MULTIPLEXED DATA

(75) Inventor: Lars Friedrich, München (DE)

(73) Assignee: Adva Optical Networking SE, Meiningen Ot, Drießigacker (DE)

( * ) Notice: Subject to any disclaimer, the term of this patent is extended or adjusted under 35 U.S.C. 154(b) by 488 days.

(21) Appl. No.: 12/334,076

(22) Filed: Dec. 12, 2008

(65) Prior Publication Data
US 2009/0169206 A1    Jul. 2, 2009

(30) Foreign Application Priority Data

Dec. 12, 2007 (EP) .................................... 07123047
May 20, 2008 (EP) .................................... 08156577

(51) Int. Cl.
*H04B 10/08* (2011.01)

(52) U.S. Cl.
USPC ............................... 398/33; 398/34; 398/138

(58) Field of Classification Search
USPC ....................... 398/22, 33–36, 88, 98–99, 138
See application file for complete search history.

(56) References Cited

U.S. PATENT DOCUMENTS

| | | | |
|---|---|---|---|
| 2003/0215236 A1* | 11/2003 | Manifold | 398/79 |
| 2003/0218981 A1 | 11/2003 | Scholten | |
| 2004/0114931 A1* | 6/2004 | Talbot | 398/83 |
| 2004/0203289 A1 | 10/2004 | Ice et al. | |
| 2004/0252688 A1* | 12/2004 | May et al. | 370/389 |
| 2005/0265329 A1 | 12/2005 | Havala et al. | |
| 2006/0209886 A1* | 9/2006 | Silberman et al. | 370/466 |
| 2009/0317073 A1* | 12/2009 | Hotchkiss et al. | 398/1 |

FOREIGN PATENT DOCUMENTS

WO      03/084281      10/2003

OTHER PUBLICATIONS

Okamoto S. Et al., "IP Backbone Network Utilizing Photonic Transport Network Technologies", Optical Networks Magazine, SPIE, Bellingham, WA, US, vol. 1, No. 1, (Jan. 1, 2001), pp. 19-28.
Office Action dated Mar. 27, 2009 in corresponding European Patent Application 08156577.2.
Office Action dated Mar. 30, 2009 in corresponding European Patent Application 08171513.8.
Office Action dated Mar. 30, 2009 in corresponding European Patent Application 07150171.2.
Office Action dated Mar. 30, 2009 in corresponding European Patent Application 08171352.1.
Office Action dated Apr. 4, 2009 in corresponding European Patent Application 08171052.7.
Office Action dated Apr. 6, 2009 in corresponding European Patent Application 08171206.9.
Office Action dated Apr. 6, 2009 in corresponding European Patent Application 08171376.0.
European Office Action Dated Feb. 16, 2012.

* cited by examiner

*Primary Examiner* — Dzung Tran
(74) *Attorney, Agent, or Firm* — F. Chau & Associates, LLC

(57) ABSTRACT

The invention relates to a network comprising at least one host device having an interface card connected to a backplane of said host device, wherein said interface card comprises at least one cage, for receiving a pluggable module which performs signal processing of data comprised of at least one WDM channel transported via at least one optical fiber connected to said pluggable module in the optical domain.

13 Claims, 25 Drawing Sheets

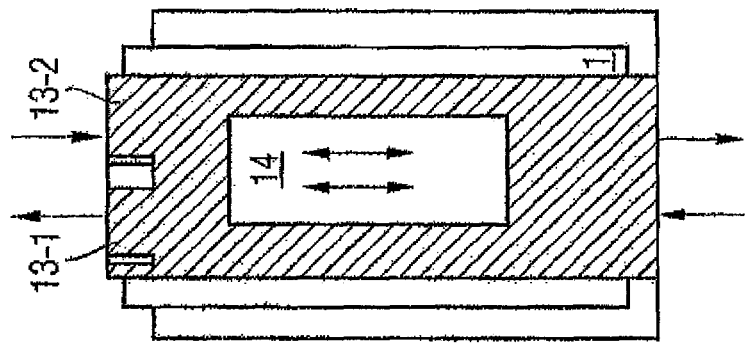
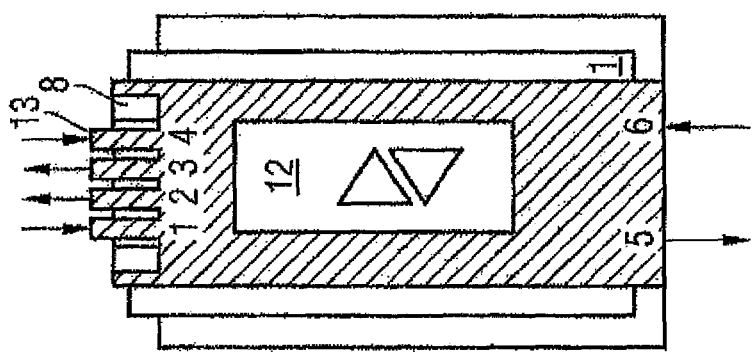
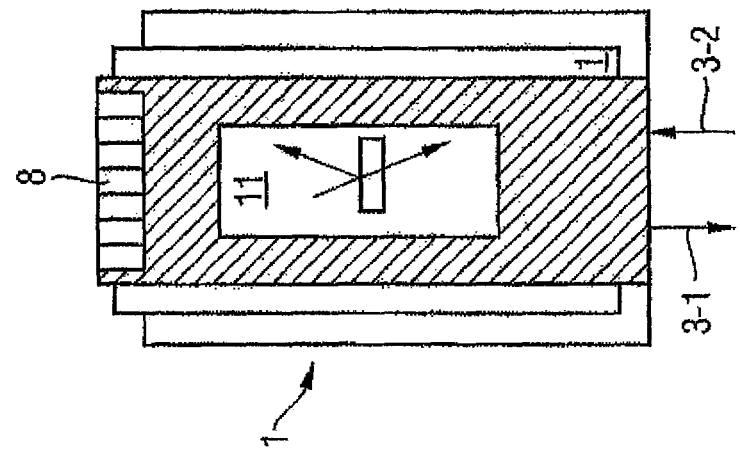

Fig. 15

| Byte | Bit | Name | Description |
|---|---|---|---|
| Converted analog values. Calibrated 16 bit data. | | | |
| 96 | All | Temperature MSB | Internally measured module temperature. |
| 97 | All | Temperature LSB | |
| 98 | All | Voc MSB | Internally measured supply voltage in transceiver. |
| 99 | All | Voc LSB | |
| 100 | All | TX Bias MSB | Internally measured TX Bias Current. |
| 101 | All | TX Bias LSB | |
| 102 | All | TX Power MSB | Measured TX output power. |
| 103 | All | TX Power LSB | |
| 104 | All | RX Power MSB | Measured RX input power. |
| 105 | All | RX Power LSB | |
| 106-109 | All | Unallocated | Reserved for future diagnostic definitions |
| Optional Status/Control Bits | | | |
| 110 | 7 | TX Disable State | Digital state of the TX Disable input Pin. Updated within 100 msec of change on pin. |
| | 6 | Soft TX Disable | Read/Write bit that allows software disable of laser. Writing '1' disables laser. See Table 3.11 for enable/ disable timing requirements. This bit is "OR'd with the hard TX_DISABLE pin value. Note per SFP MSA TX_DISABLE pin is default enabled unless pulled low by hardware. If Soft TX Disable is not implemented, the transceiver ignores the value of this bit. Default power up value is zero/low. |
| | 5 | RS(1) State | Reserved for digital state of input pin AS(1) per SFF-8079 and RS(1) per SFF-8431. Updated within 100msec of change on pin. |
| | 4 | Rate Select State | Digital state of the SFP Rate Select Input Pin. Updated within 100msec of change on pin. Note: This pin is also known as AS(0) in SFF-8079 and RS(0) in SFF-8431. |
| | 3 | Soft Rate Select | Read/write bit that allows software rate select control. Writing '1' selects full bandwidth operation. This bit is "OR'd with the hard Rate_Select AS(0) or RS(0) pin value. See Table 3.11 for timing requirements. Default at power up is logic zero/low. If Soft Rate Select is not implemented, the transceiver ignores the value of this bit. Note: Specific transceiver behaviors of this bit are identified in Table 3.6a and referenced documents. See Table 3.18a, byte 118, bit 3 for Soft RS(1) Select. |
| | 2 | TX Fault | Digital state of the TX Fault Output Pin. Updated within 100 msec of change on pin. |
| | 1 | LOS | Digital state of the LOS Output Pin. Updated within 100 msec of change on pin. |
| | 0 | Data_Ready_Bar | Indicates transceiver has archieved power up and data is ready. Bit remains high until data is ready to be read at which time the device sets the bit low. |
| 111 | 7-0 | Reserved | Reserved for SFF-8079. |

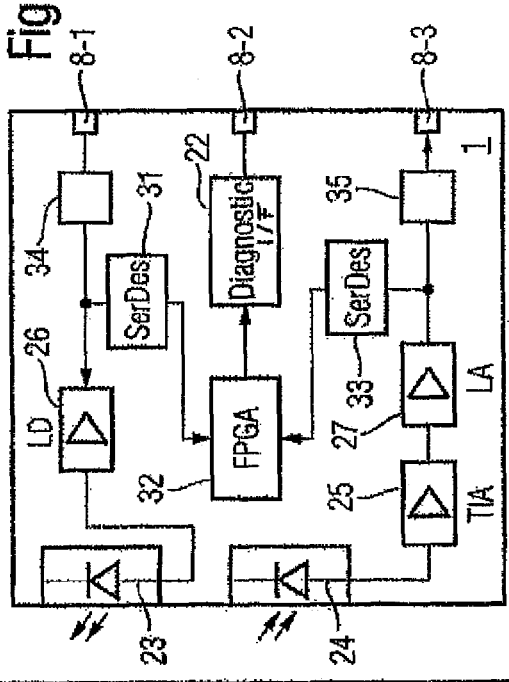
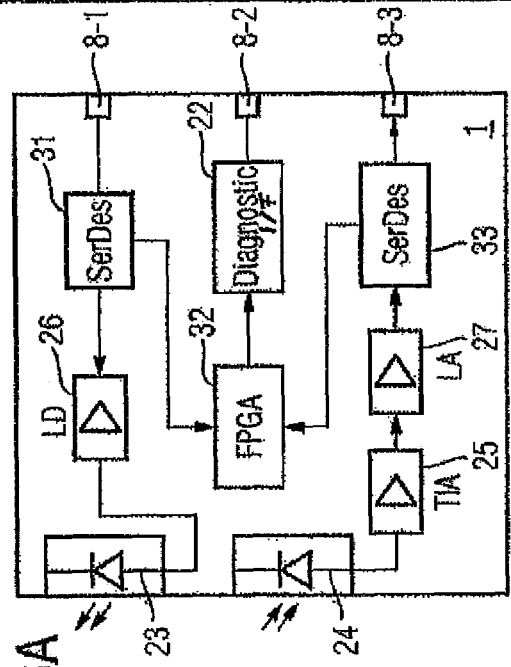
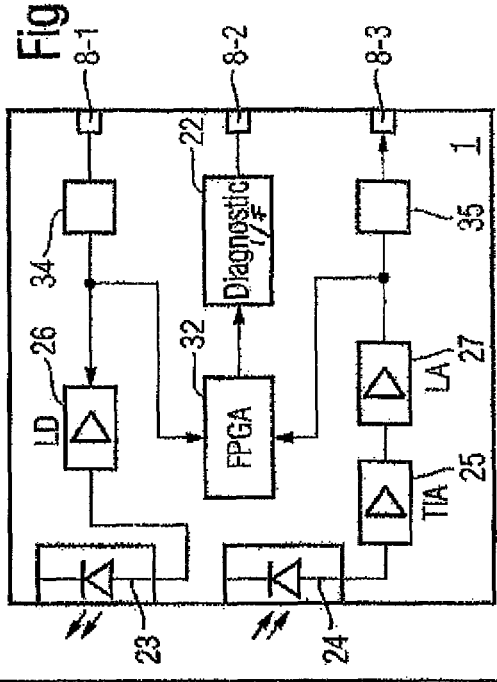
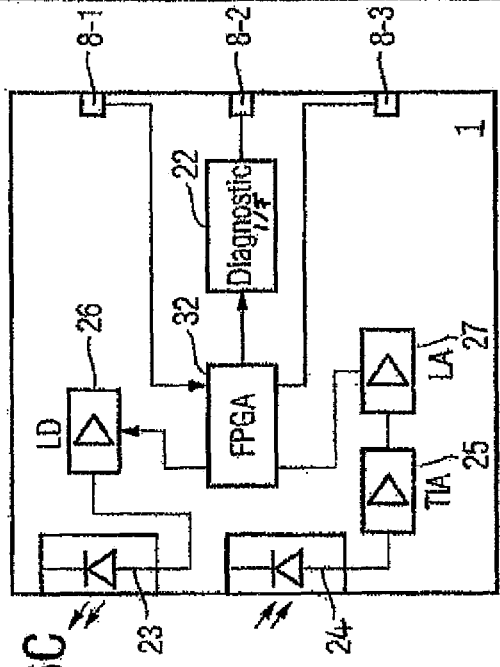

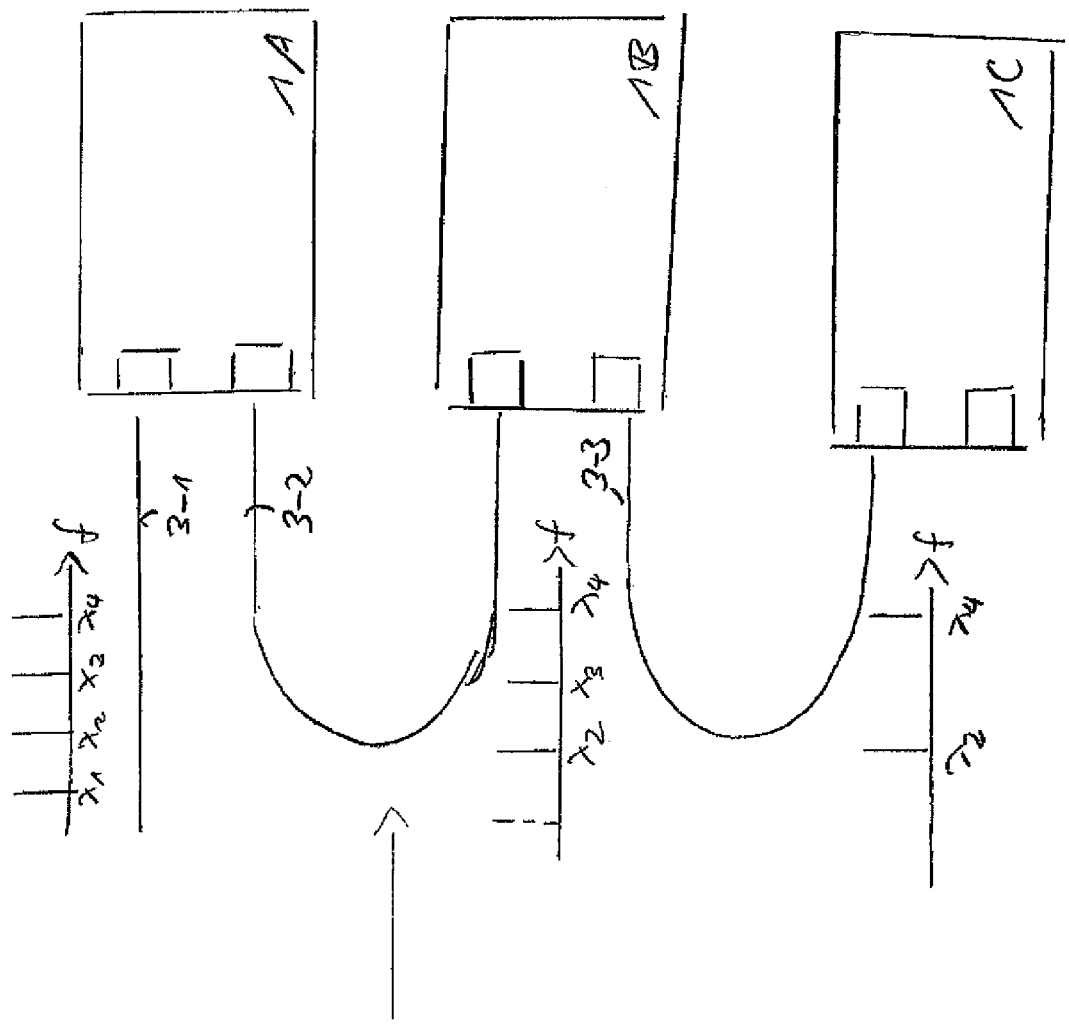

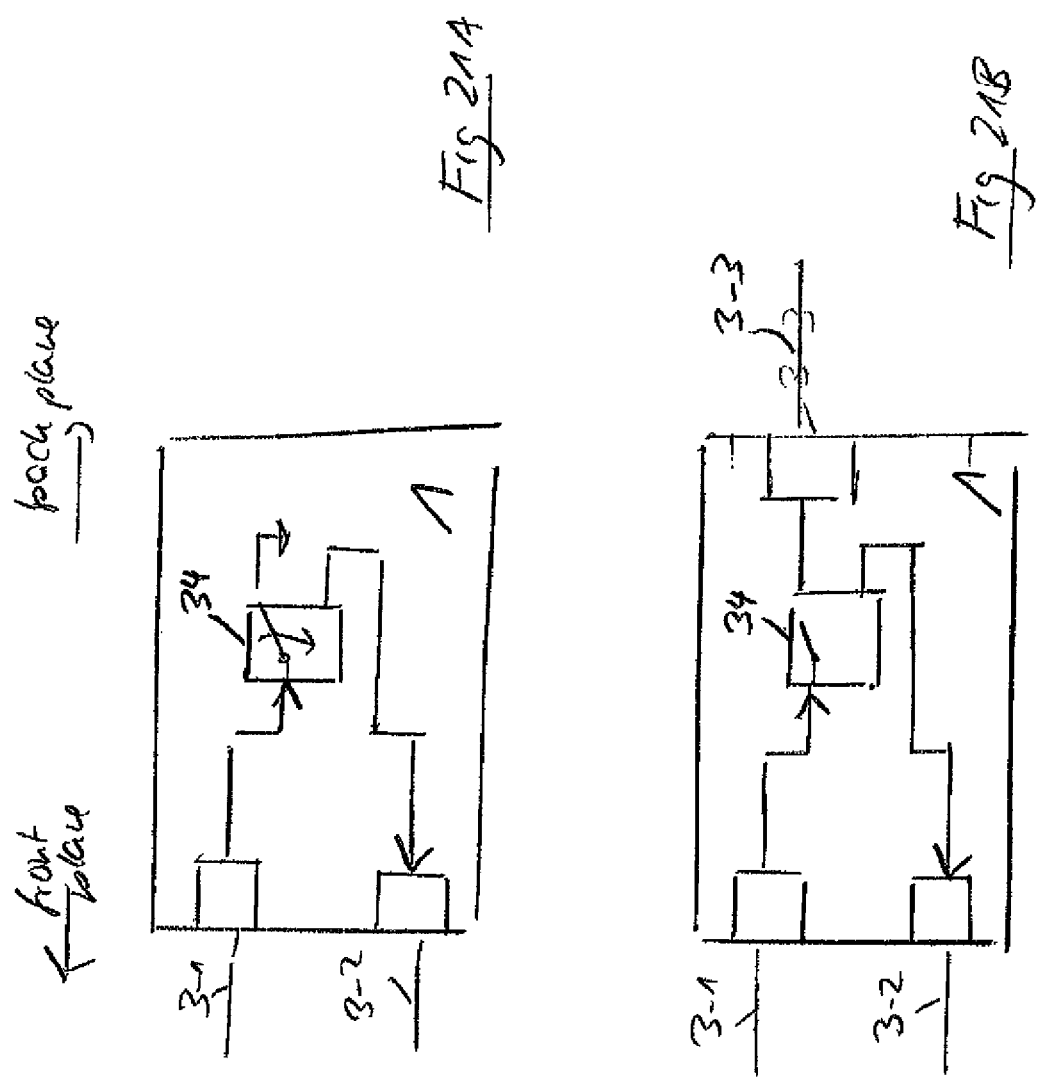

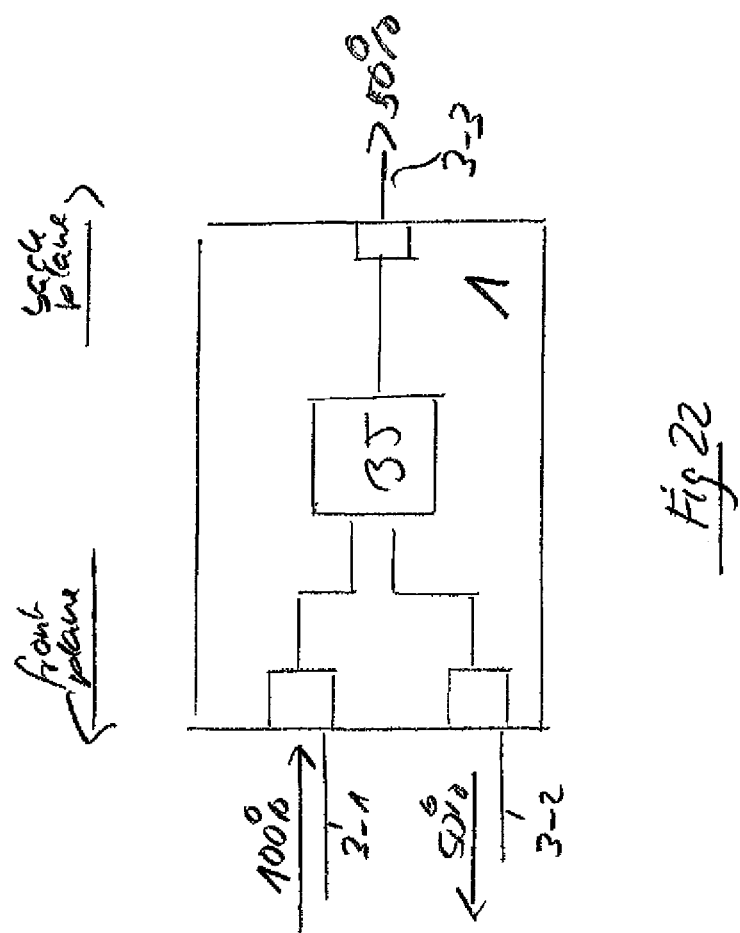

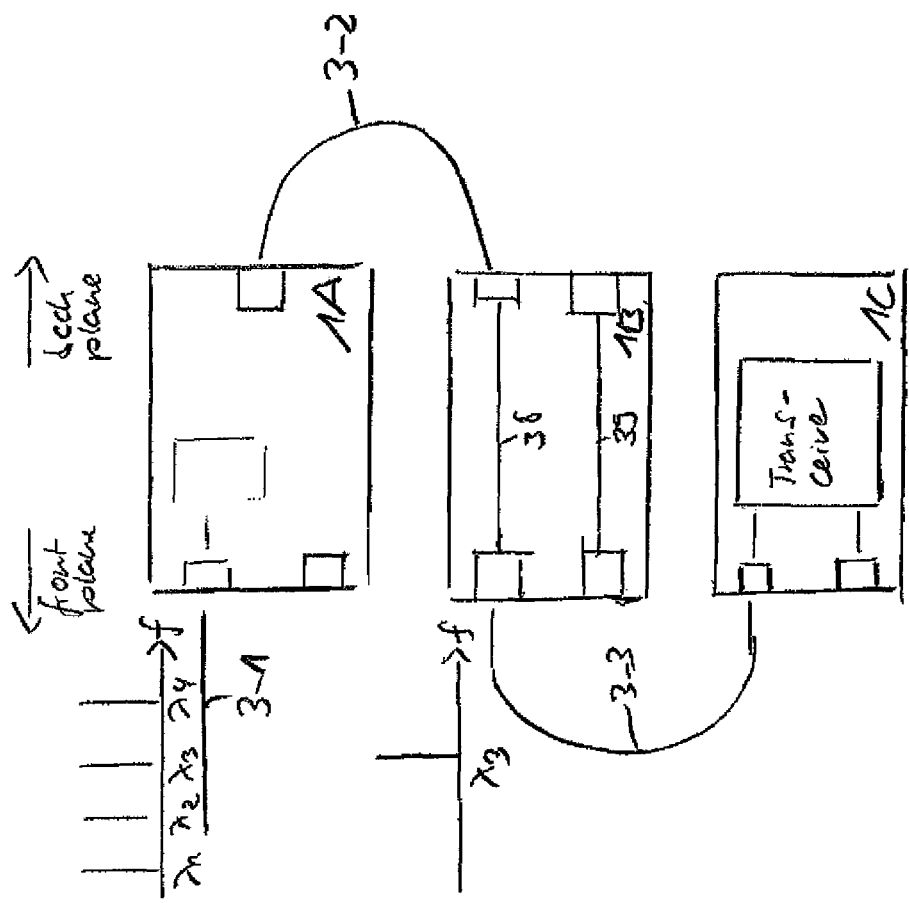

METHOD AND A NETWORK FOR PROCESSING OF WAVELENGTH DIVISION MULTIPLEXED DATA

The invention relates to a method and a network for transport of wavelength division multiplexed data and in particular to a MSA compatible pluggable module for transport of data via at least one optical fibre between host devices.

TECHNICAL BACKGROUND

FIG. 1 shows a conventional architecture of an optical network. The network architecture is hierarchical having the highest data rates in an optical core network, such as a backbone network of a country. To each core network several optical metro networks can be connected, for instance in a ring structure. To each metro network in turn several access networks can be connected. The edge of the network as shown in FIG. 1 is formed by terminal devices T which can be connected via xDSL (version of Digital Subscriber Line) to a host device, for example to a switch in an DSLAM (Digital Subsciber Line Access Multiplexer). This switch is connected via an optical transport system (designated as FSP in all figures) and optical transport means to a transport system of a local exchange. The core, metro and access network can have a ring structure, for example formed by two optical fibres and by transport systems. The optical fibres can transport data by means of wave length division multiplexing WDM. In wave length division multiplexing WDM optical carrier signals are multiplexed on a single optical fibre by using different wave lengths λ (colours) to carry different data signals. This allows an increased bandwidth and makes it possible to perform bidirectional communication over one strand of fibre. WDM-systems allow to expand the capacity of a network without laying more fibre. The capacity of an optical fibre can be expanded by upgrading multiplexers and demultiplexers at each end. This is often done by using optical-to-electrical-to-optical conversion at the edge of the transport network to permit interoperation with existing equipment. WDM-systems can be divided in different wave length patterns, i.e. conventional or coarse and dense WDM (CWDM, DWDM). A recent development relating course WDM is the creation of GBIC (Gigabit Interface Converter) and Small Form Factor Pluggable (SFP) transceivers using standardized CWDM-wave lengths.

As can be seen from FIG. 1, an optical network can be formed by two main components, i.e. by a transport system and by host devices. Host devices include switching devices, such as routers, bridges, Ethernet switches, fibre channel switches or cross-connects. The network architecture as shown in FIG. 1 comprises optical interconnections, optical transport systems and host devices, such as switches or routers. The separation of functionality in two different device types of the conventional network as shown in FIG. 1, i.e. on the one hand transport of data (by the transport system) and on the other hand aggregation/switching data (by the host devices) increases complexity and costs.

Accordingly, it has been proposed to shift functionality of the transport system, in particular the electrical-to-optical conversion, into the host device by using pluggable transceivers.

A small form factor pluggable (SFP) is a compact optical transceiver using optical communication. A conventional small form factor pluggable module interfaces a network device mother board of a host device, such as a switch or router to an optical fibre or unshielded twisted pair networking cable. The SFP-transceivers are available in a variety of different transmitter and receiver types allowing users to select an appropriate transceiver for each link to provide a required optical reach over the available optical fibre type.

A SFP-transceiver is specified by a multi-source agreement (MSA) between competing manufacturers. The SFP-module is designed after the GBIC-interface and allows greater data port density (i.e. number of transceivers per inch along the edge of a mother board) than GBIC. SFP-transceivers are commercially available and have a capability for data rates up to 4.25 Gbit/sec. A variant standard, XFP, is capable of 10 Gbit/sec.

Some SFP-transceivers support digital optical monitoring functions according to the industry standards SSF 8472 (ftp://ftp.seagate.com/sff/SFF-8472.PDF) multi-source agreement (MSA). This makes it possible for an end user to monitor real time parameters of the SFP-module, such as optical output power, optical input power, temperature, laser bias current and transceiver supply voltage.

FIGS. 2, 3 show a conventional pluggable standard SFP-transceiver module. The SFP pluggable module comprises an electrical interface connecting the pluggable module with a mother board of a host device by plugging the module into a cage of the host device board. On the front side of the pluggable module at least one optical fibre is attached to the module.

FIG. 4 shows a conventional system with pluggable SFP-transceivers according to the state of the art. A host device, such as a switch or router, comprises a controller which is connected via a backplane to interface cards each having several cages which allow to plug in SFP-modules as shown in FIG. 3. A transceiver within the pluggable module performs a conversion of the applied electrical signals to an optical signal which is forwarded via an optical fibre to the transport system. The transport system comprises several cards which comprise several cages for plug-in SEP-transceiver modules. These interface cards allow a switching, i.e. multiplexing or demultiplexing of signals within the electrical domain in response to control signals generated by a controller of the transport system and received via an internal management connection. From the interface cards within the transport system the switched or controlled signals are applied to further modules for optical signals or optical fibres. These modules can, for example comprise variable optical attenuators (VOA), multiplexers/demultiplexers, amplifiers, switchers etc. From the transport system connected to the near end host device, the signals are forwarded via optical fibres to remote far end transport systems over a distance of many kilometers, wherein the remote transport systems are in turn connected to far end host devices.

The conventional system as shown in FIG. 4 has as an disadvantage that the complexity of the system is quite high because three domain conversions on the near end side and on the far end side have to be performed. As can be seen from FIG. 4, an electrical signal of the near end host device is converted within the pluggable SFP-transceivers plugged into the interface card of the host device to an optical signal and then retransformed from the optical domain to the electrical domain by a SFP-transceiver plugged into a cage of an interface card of the transport system. After an electrical switching is performed depending on the control signal supplied by the controller of the transport system, the electrical signal is again transformed from the electrical domain into an optical domain by another plugged in SFP-transceiver. Accordingly at the near end side, three domain conversions, i.e. an electrical-to-optical, an optical-to-electrical and an electrical-to-optical conversion are necessary. On the far end side, the three conversions are performed again resulting in a total of six domain conversions. Because of the necessary domain conversions, the technical complexity of the system is quite high. Since two different devices, i.e. a host device and a transport system have to be provided on each side management efforts, the occupied space and power consumption are increased.

Accordingly, it is an object of the present invention to provide a method and a system which minimizes the number of necessary components to reduce the complexity of a network system.

SUMMARY OF THE INVENTION

The invention provides a network comprising at least one host device having an interface card connected to a backplane of said host device, wherein said interface card comprises at least one cage for receiving a pluggable module which performs signal processing of data comprised of at least one WDM-channel transported via at least one optical fiber connected to said pluggable module in the optical domain.

In an embodiment of the network according to the present invention the pluggable module is a MSA-compatible module comprising a SFP-module, a XFP-module, a GBIC-module or a XFN-module.

In an embodiment of the network according to the present invention, said host devices comprise switching devices and optical transport devices.

In an embodiment of the network according to the present invention, the switching devices comprise router, bridges, Ethernet switches and Fibre Channels switches.

In an embodiment of the network according to the present invention, the optical transport device comprise SDH, SONET, PDH, OTH, Ethernet, Fibre Channel, FICON and uncompressed video transport devices.

In an embodiment of the network according to the present invention the pluggable module performs monitoring and manipulation of optical signals.

In an embodiment of the network according to the present invention the pluggable module comprises an optical filter.

In a further embodiment of the network according to the present invention the pluggable module comprises a variable optical attenuator.

In a further embodiment of the network according to the present invention the pluggable module comprises an optical amplifier.

In an embodiment of the network according to the present invention the pluggable module comprises an optical switching device.

In an embodiment of the pluggable module according to the present invention the pluggable module comprises a dispersion compensation unit.

In an embodiment of the network according to the present invention the pluggable model comprises an optical power splitter.

In an embodiment of the network according to the present invention the pluggable module comprises an optical loop device.

In an embodiment of the network according to the present invention the pluggable module comprises an optical connection device.

The invention further provides a pluggable module for a transport of wavelength division multiplexed (WDM) data via at least one optical fibre between host devices, wherein the module is adapted to be pluggable into a corresponding cage of one of said host devices and performs signal processing of the data comprised of at least one WDM-channel in the optical domain.

In an embodiment of the pluggable module according to the present invention the pluggable module is a MSA compatible pluggable module comprising an SFP-module, a XFP-module, a GBIC-module and an XFN-module.

The invention further provides an interface card for a host device comprising at least one cage for receiving a pluggable module which performs signal processing in the optical domain of data comprised of at least one WDM-channel and transported via at least one optical fibre connected to the pluggable module.

The invention further provides a host device comprising at least one interface card connected to a backplane of said host, wherein said interface card comprises at least one cage for receiving a pluggable module which performs signal processing in the optical domain of data comprised of at least one WDM-channel, wherein the data is transported via at least one optical fibre connected to said pluggable module.

The invention further provides a data transport system for transporting wavelength division multiplexed (WDM) data via at least one optical fibre, wherein at one or both ends of said optical fibre a pluggable module is provided which performs signal processing of the data transported via said optical fibre in the optical domain.

The invention further provides a method for a transport of wavelength division multiplexed (WDM) data between host devices of a network via at least one optical fiber, wherein a pluggable module attached to said optical fibre is plugged into a corresponding cage of one of the host devices and a signal processing of said data comprising at least one WDM-channel is performed by the plugged-in module in the optical domain.

The invention further provides a computer program comprising instructions for performing a transport of wavelength division multiplexed data between host devices of a network via at least one optical fibre, wherein a signal processing of data comprising at least one WDM-channel is performed by a module plugged into a corresponding cage of at least one host device in the optical domain.

The invention further provides a data carrier which stores such a computer program.

DETAILED DESCRIPTION OF EMBODIMENTS

In the following, preferred embodiments of the method and system according to the present invention are described with reference to the enclosed figures.

FIG. 15 shows a section within the memory shown in FIG. 14;

FIGS. 16A-16D show block diagrams of possible embodiments of the pluggable module according to the present invention;

FIGS. 21A, 21B show further possible embodiments of a pluggable module according to the present invention;

FIG. 22 shows a further embodiment of a pluggable module according to the present invention;

FIG. 24 shows a further example for wiring pluggable modules according to the present invention.

DETAILED DESCRIPTION OF EMBODIMENTS

Figure 5:
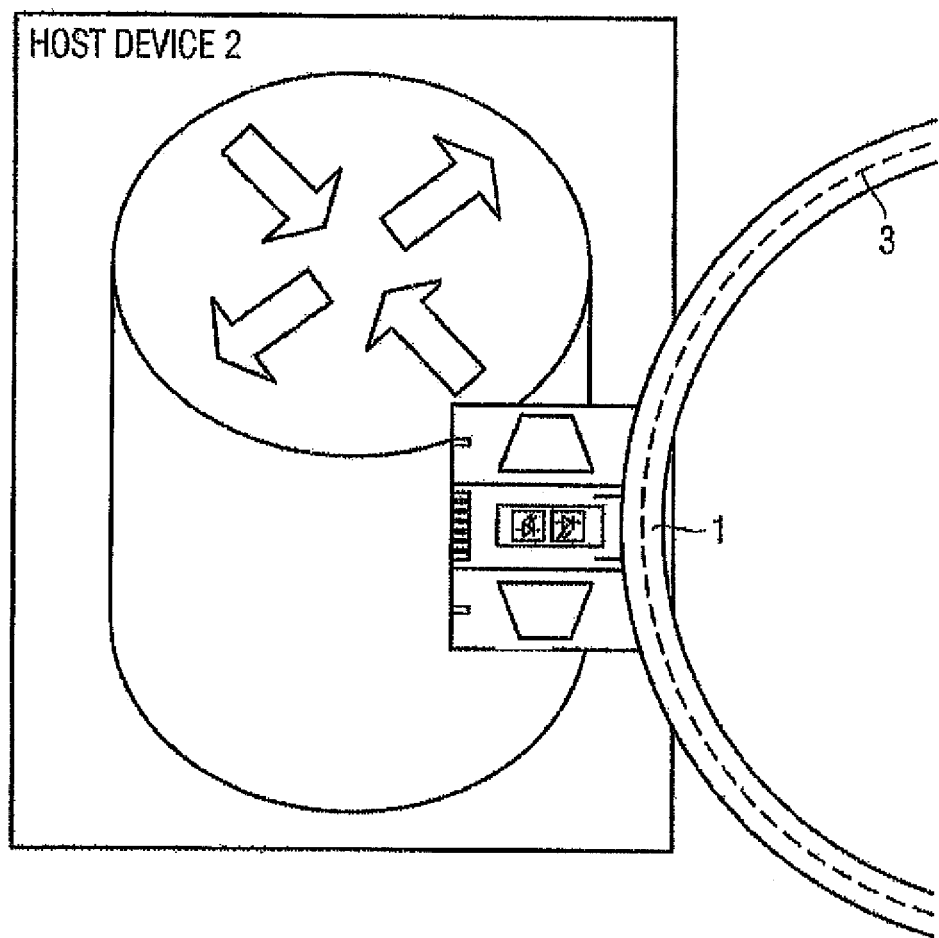
FIG. 5 shows a block diagram of a host device with a plugged in pluggable module according to the present invention.

FIG. 5 shows a pluggable module 1 according to the present invention plugged into a cage of a host device 2. The host device 2 can be a switching device, such as a router, a bridge, an Ethernet bridge or a fibre channel switch. The module 1 as shown in FIG. 5 is adapted to be plugged into a corresponding cage of the host device 2 and performs a traffic management of data which is transported bidirectionally via at least one optical fibre 3 between host devices 2 of a data network. Traffic management comprises the provision of an Embedded Communication Channel (ECC), reporting of DMI data via said Embedded Communication Channel digital performance monitoring, Latency measurements, performing of link tests, protocol mapping time-slot based ADM, asymmetric TDM as well as optical signal processing.

The traffic management of the data is performed within the pluggable module 1 and can be either performed in the electrical domain or in the optical domain. The pluggable module 1 as shown in FIG. 5 comprises an SFP (small form factor) pluggable module and also supports digital monitoring functions according to SFF 8472. The pluggable module 1 according to the present invention does not only perform transceiver functions, i.e. conversion between the optical and electrical domain, but also data traffic management functions. The data traffic management is performed by the pluggable module 1 as a near end and far end traffic management of the transported data. The data traffic management is formed by a pluggable module 1 on the basis of the communication between the pluggable module 1 and different host devices 2 of the optical network. In a possible embodiment, the communication is using a SFF 8742-programming page structure with no adaptions. In further embodiments, the traffic management can be based on a communication between the pluggable module 1 and host devices 2, wherein the communication is using a SFF 8742-programming page structure with no adaptions and a time division multiplex update procedure to buffer additional near end or far end parameters within the provided SFF 8742-programming page structure. In an alternative embodiment, the traffic management can be based on a communication between the pluggable module 1 and host devices 2, wherein the communication is using a SFF 8742-programming page structure with additional address spaces. The traffic management can be based on a communication between the pluggable module 1 as shown in FIG. 5 and a far end pluggable module which is attached to a remote end of the optical fibre 3 as shown in FIG. 5. The pluggable module 1 as shown in FIG. 5 comprises several transport management functionalities, such as protection switching, performance monitoring, OAM, DCN (Data Communication Network), mapping and framing, amplification, reconfigurable optical add/drop multiplexing (ROADM) and dispersion compensation DC. Further traffic management functionalities can comprise an optical transmission impairment mitigation, such as amplification and chromatic polarization mode compensation.

A traffic management functionality provided by a pluggable module 1 according to the present invention is electrical transmission and impairment mitigation with forward error correction and electronic dispersion compensation.

A further traffic management functionality of the pluggable module 1 according to the present invention can be in one embodiment OAM (operation administration and maintenance) functionalities, such as performance monitoring, default management, inter-device communication, configuration management and security management.

In a possible embodiment, the pluggable module 1 according to the present invention comprises optical and/or electrical add/drop multiplexing functionalities. Furthermore, in a possible embodiment, the traffic management functionality of the pluggable module 1 comprises optical conversion with mapping and framing functions. The pluggable module 1 complies in a possible embodiment with existing MSA-agreements, such as SFP, SFP+, XFP, GBIC etc.

Figure 6:
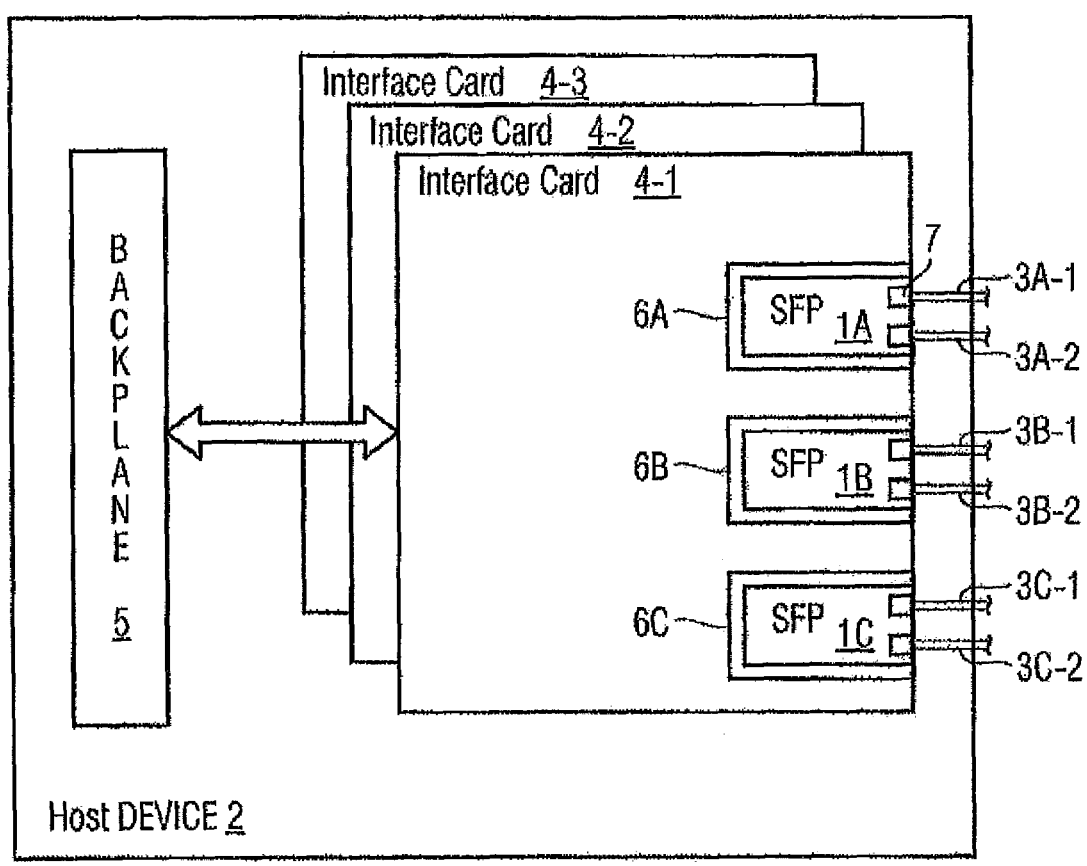
FIG. 6 shows a block diagram of a host device according to an embodiment of the present invention.

FIG. 6 shows a possible embodiment of a host device 2 according to the present invention. The host device 2 comprises at least one interface card 4 connected to a common backplane 5 of the host device 2. Each interface card 4 comprises several cages 6 for receiving pluggable modules 1 according to the present invention. In the given example of FIG. 6, the interface card 4-1 comprises three cages 6A, 6B, 6C for receiving a corresponding SFP pluggable modules 1A, 1B, 1C. Each pluggable module 1 comprises on the front side an optical interface to at least one optical fibre 3. In the given example, each SFP plug-in module 1 as shown in FIG. 6 comprises an interface with two optical fibres for bidirectional optical transport of data. On the rear side, each pluggable module 1 comprises at least an electrical interface for connecting the pluggable module 1 with the circuitry on the interface card 4 of the host device 2.

Figure 7:
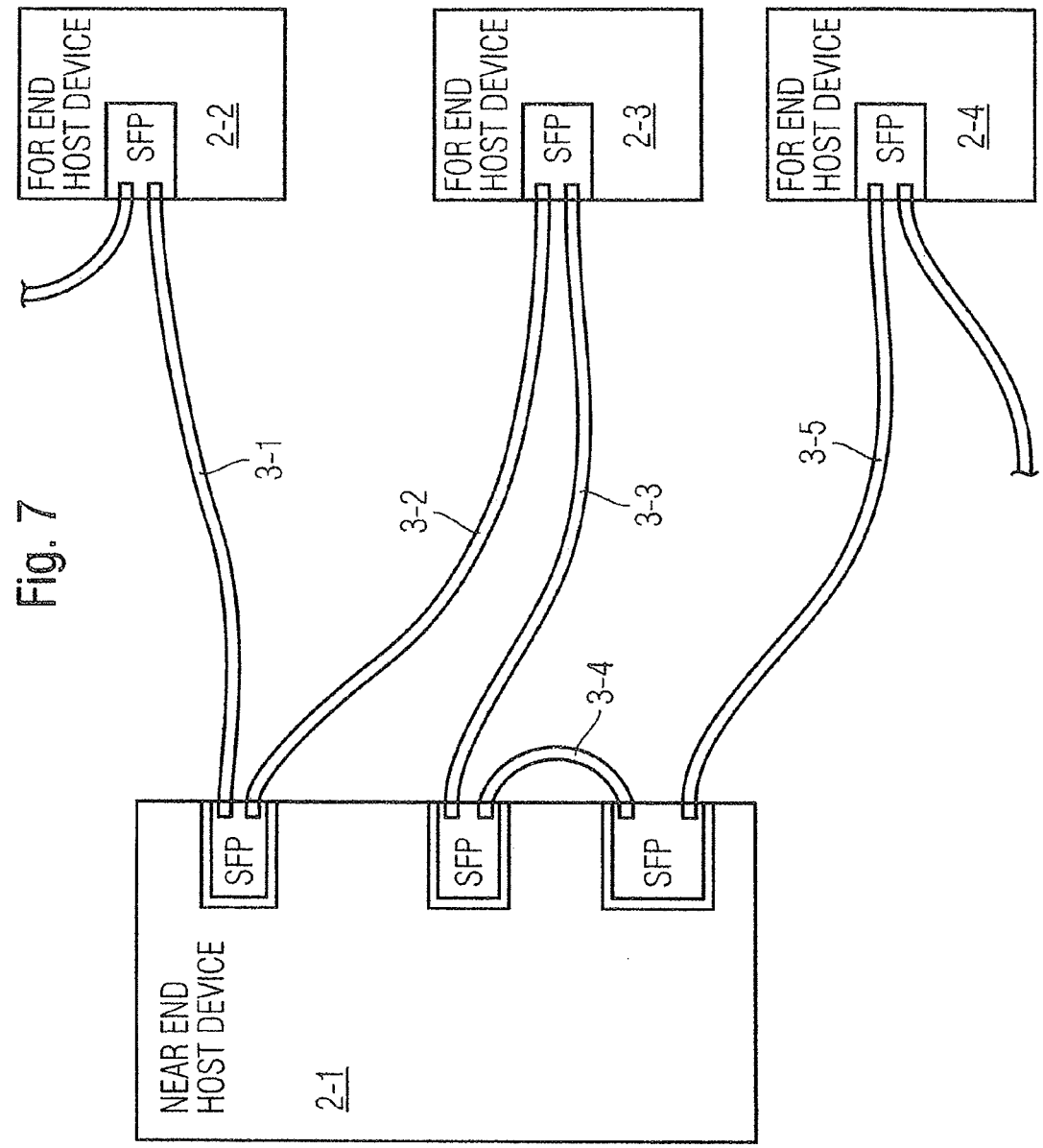
FIG. 7 shows an exemplary arrangement of host devices connected to each other by means of a data transport system according to a possible embodiment of the present invention.

FIG. 7 shows an example for connecting host devices 2 of a network via pluggable modules 1 according to the present invention. In the given example, a near end host device 2-1 can be connected via data transport systems to far end host devices 2-2, 2-3, 2-4. Each data transport system is provided for transporting bidirectional optical data via at least one optical fibre 3. At both ends of the optical fibre 3, a pluggable SFP-module 1 is attached and performs a traffic management of the transported data.

Figure 8:
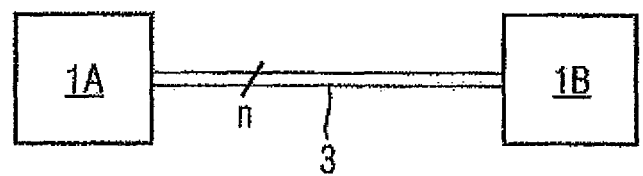
FIG. 8 shows an embodiment of a transport data system according to an embodiment of the present invention.

FIG. 8 shows a possible embodiment of a data transport system for transporting bidirectional optical data according to the present invention. As shown in FIG. 8, two pluggable modules 1A, 1B are attached via an optical interface to at least one optical fibre 3 connecting both modules. In a possible embodiment, at least one of the pluggable modules 1A, 1B is capable of performing a data traffic management. In a possible embodiment, both pluggable modules are formed by SFP-modules connected to each other via optical fibres 3.

As can be seen from FIG. 7, with the data transport system according to the present invention as shown in FIG. 8, it is possible to connect a near end host device 2-1 to a far end host device. It is also possible to wire the near end host device 2-1, for example via an optical fibre 3-4 as shown in FIG. 7. As can be seen from FIG. 7, the network according to the present invention has the advantage when compared to the conventional system of FIG. 4 that a separate transport system device in a separate box is no longer necessary so that wiring host devices 2 within the network is much easier and more flexible. Since the separate transport system device is no longer necessary, the optical network using the pluggable modules 1 according to the present invention needs less space and is more transparent to users performing the wiring between the host devices 2.

Figure 1:
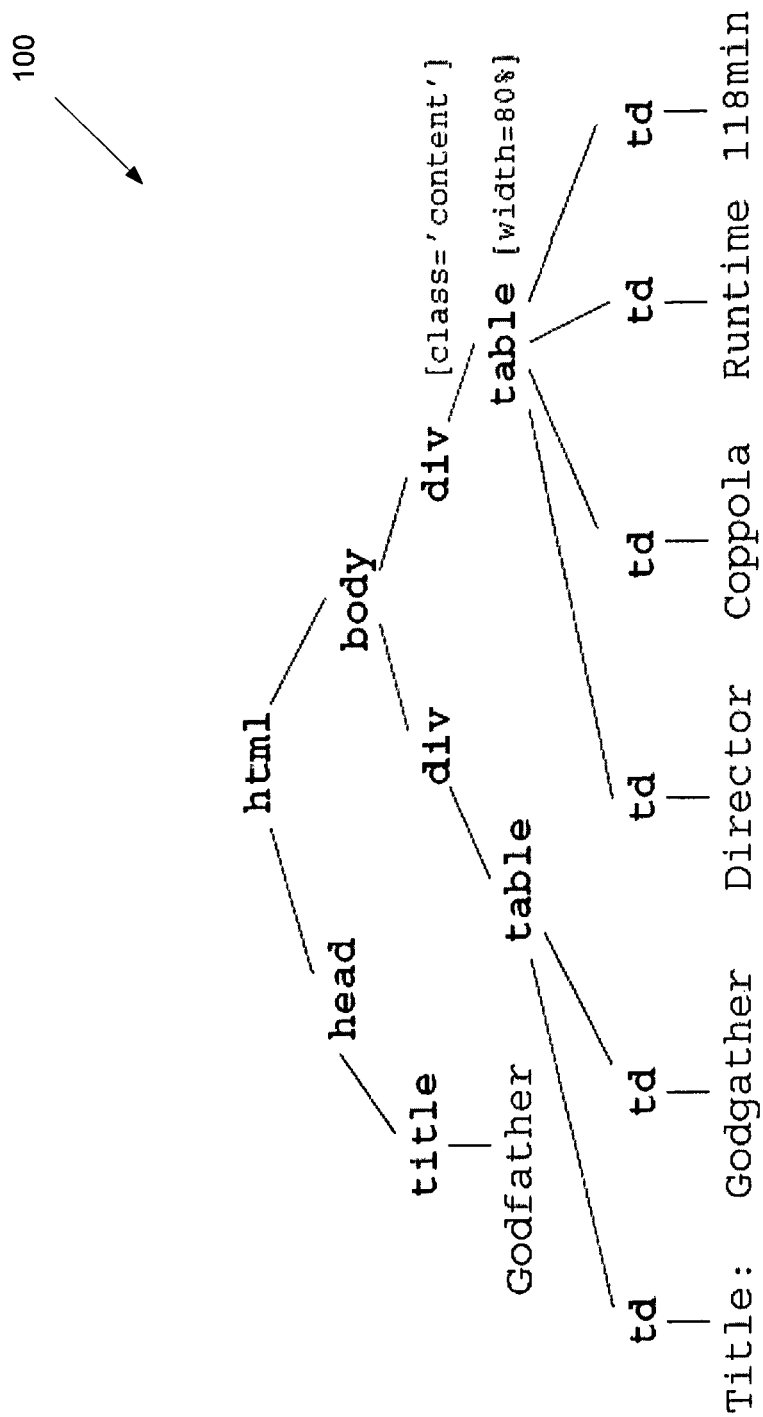
FIG. 1 shows an architecture of a hierarchical network according to the state of the art.
Figure 2:
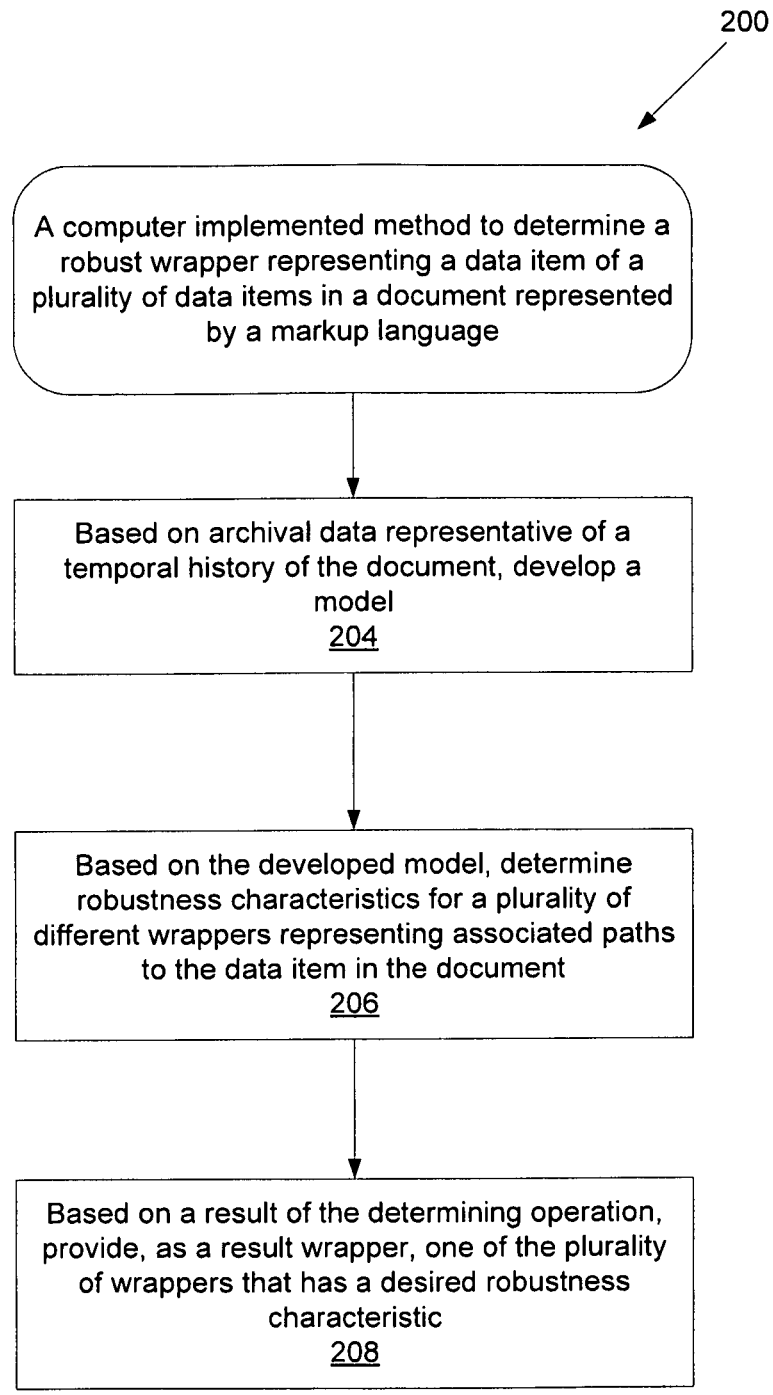
FIG. 2 shows an arrangement of a host device and a transport system according to the state of the art.
Figure 3:
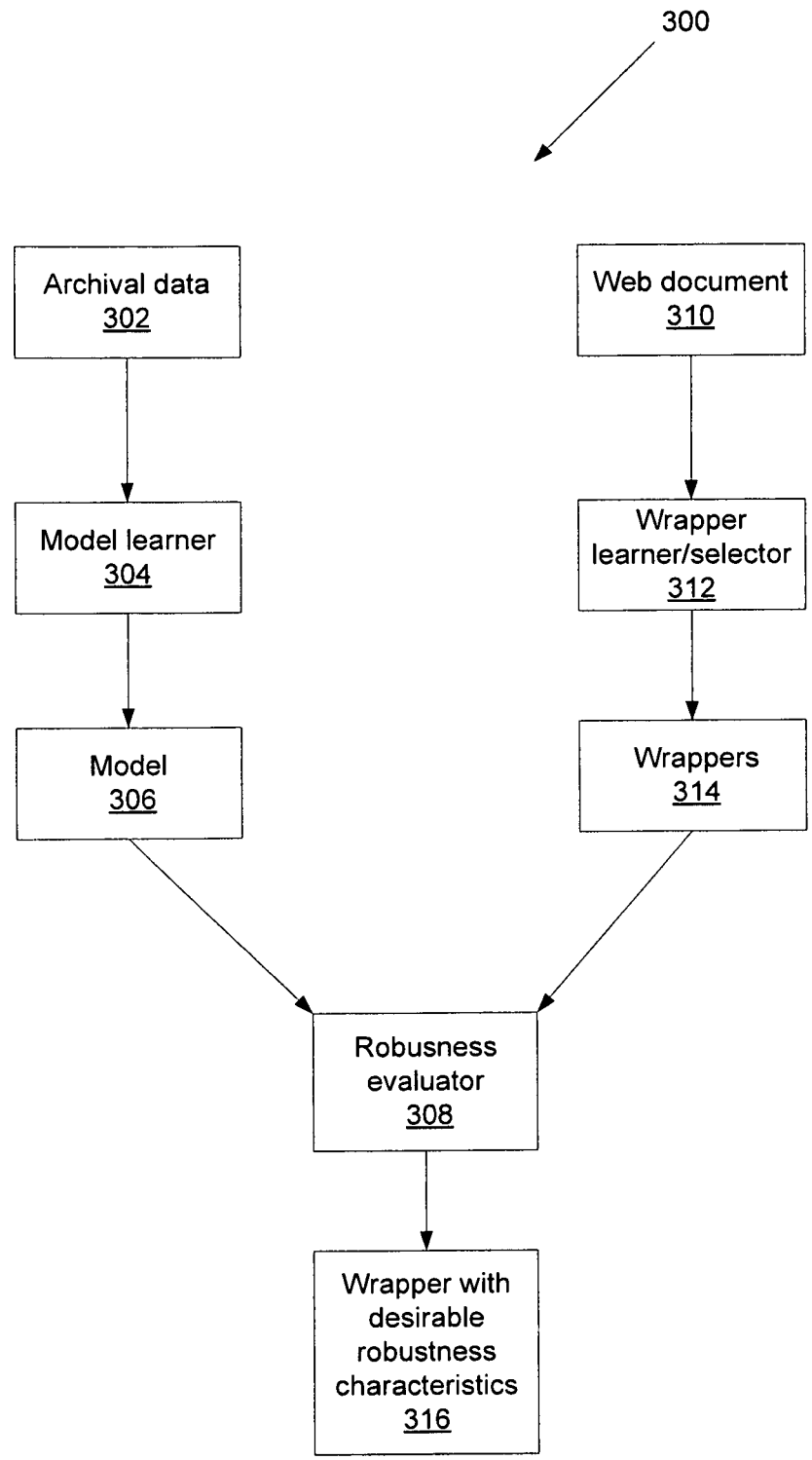
FIG. 3 shows a conventional FSP-module with a transceiver according to the state of the art.
Figure 4:
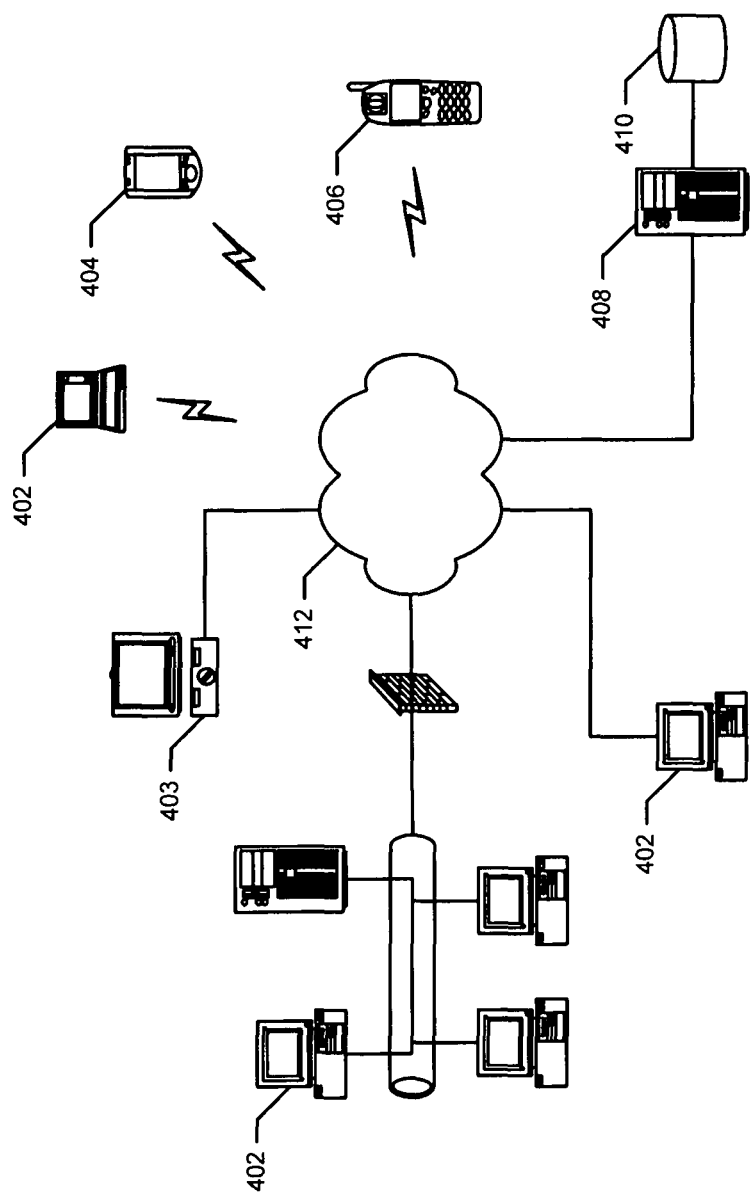
FIG. 4 shows an arrangement of a host device and a transport system according to the state of the art for illustrating the problem underlying the present invention.

A further major advantage of the optical network using the pluggable modules 1 according to the present invention resides in that the number of domain conversions between the electrical and optical domain is minimized. For the transport of data from one host device 2 to another host device 2 only one conversion on the near end side and one conversion on the far end side has to be performed. In contrast, the conventional network as shown in FIG. 4 needs three domain conversions on each side.

FIGS. 9A-9J show different embodiments of a pluggable module 1 according to the present invention. The pluggable module 1 comprises at least one optical interface 7 on the front side and an electrical interface 8 on the rear side. The electrical interface 8 comprises several electrical contacts for connecting the pluggable module 1 with the circuitry of a motherboard by inserting the pluggable module 1 into a corresponding cage 6 mounted on the mother board.

Figure 9A:
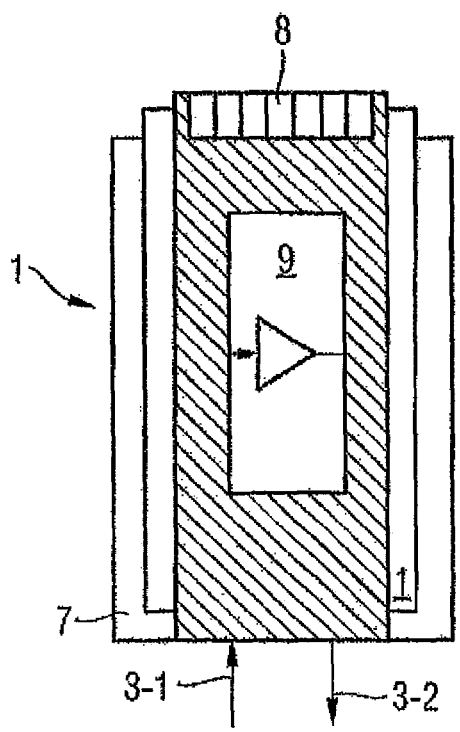
FIGS. 9A-9J show different embodiments of a pluggable module according to the present invention.

In the embodiment as shown in FIG. 9A, the pluggable module 1 comprises an unidirectional single amplifier 9 within the pluggable module 1. This unidirectional amplifier 9 is described in mode detail with reference to FIGS. 17A, 17B.

The electrical interface 8 on the rear side of the pluggable module 1 can be formed by an I²C bus. On the front side of the pluggable module 1, there are attached two optical fibres 3-1, 3-2, one for receiving an optical signal and one for transmitting an optical signal.

Figure 9B:
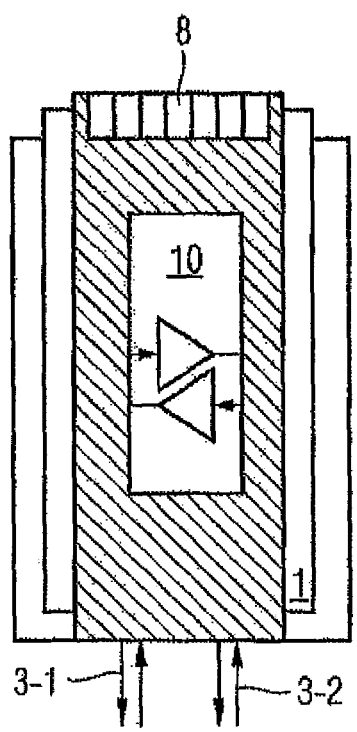

In the embodiment as shown in FIG. 9B the pluggable module 1 comprises a bidirectional signal amplifier 10, wherein each optical fibre 3-1, 3-2 transports data in both directions. The bidirectional amplifier 10 is described in more detail with reference to FIGS. 17C, 17D.

In the embodiment as shown in FIG. 9C the pluggable module 1 comprises a blocking filter 11 which can be either unidirectional or bidirectional. The blocking filter 11 can, for example block signals with different wavelength λ with the exception of a predetermined wave length. FIG. 9C shows a unidirectional blocking filter. A pluggable module 1 with a blocking filter 33 is also explained with reference to FIGS. 18, 19. A blocking filter 33 is formed in a possible embodiment by a glass plane covered with a reflective layer reflecting light of a predetermined wavelength.

FIG. 9D shows a further embodiment of the pluggable module 1 according to the present invention. In the embodiment of FIG. 9D the pluggable module 1 comprises an OADM (Optical Add Drop Multiplexer)-filter 12 which is either unidirectional or bidirectional.

FIG. 9D shows an unidirectional OADM-filter 12. As can be seen from FIG. 9D the pluggable module 1 has on the rear side not only an electrical interface 8 but also additional optical backplane plugs 13. In the given example, the module 1 comprises four optical backplane plugs 13. As can be seen from FIG. 9D the pluggable module 1 comprises six optical ports, i.e. four optical ports on the back side and two optical ports on the front side.

Figure 23A:
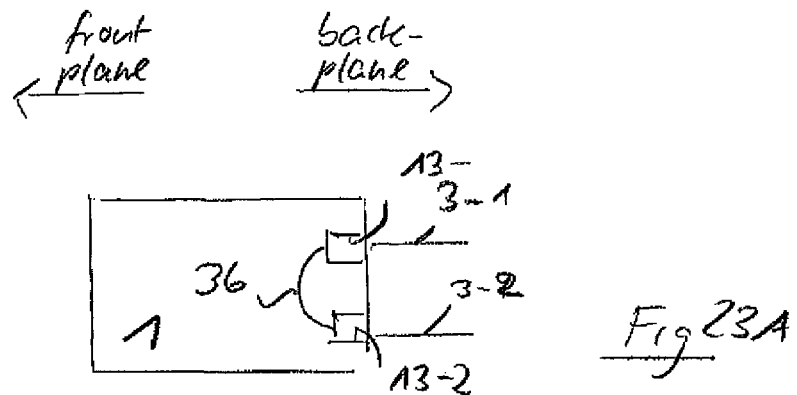
FIGS. 23A, 23B, 23C show further possible embodiments of a pluggable module according to the present invention.

FIG. 9E shows a further embodiment of the pluggable module 1 according to the present invention. In the embodiment as shown in FIG. 9E the pluggable module 1 comprises a connector plug 14, which can be either unidirectional or bidirectional. FIG. 9E shows an unidirectional connector plug 14. The pluggable module 1 as shown in FIG. 9E connects the signals to the backplane of the host device 2 optically. To achieve this, the pluggable module 1 comprises optical backplane plugs 13-1, 13-2 as shown in FIG. 9E. Such a connector plug 14 as an embodiment of the pluggable module 1 is also shown in FIG. 23C.

Figure 9F:
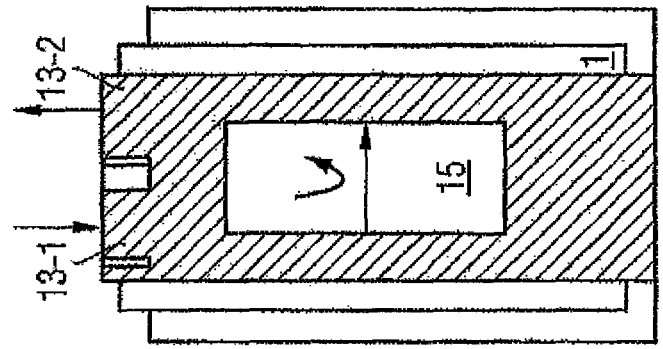

FIG. 9F shows a further embodiment of the pluggable module 1 according to the present invention. In this embodiment, the pluggable module 1 comprises a loop plug 15. The loop plug 15 can be either unidirectional or bidirectional. FIG. 9F shows a unidirectional loop plug. In the given embodiment as shown in FIG. 9F the pluggable module 1 does not comprise connectors on the front side. The loop plug 15 uses unused slots or connectors on the backside of the pluggable module 1. A loop can be either an electrical loop or an optical loop. In the example of FIG. 9F two backplane optical plugs 13-1, 13-2 form an optical loop. FIG. 23A shows a possible embodiment of such a loop plug 15.

Figure 9G:
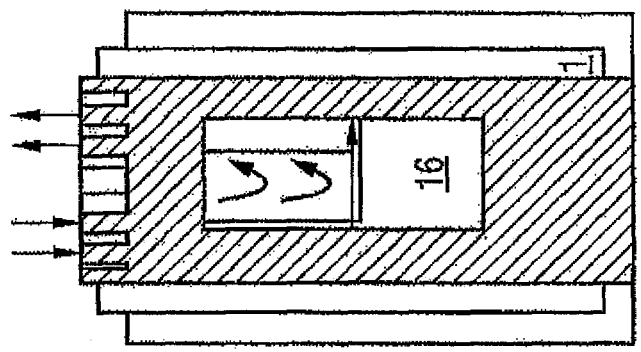

FIG. 9G shows a further embodiment of the pluggable module 1 according to the present invention. In the shown embodiment the pluggable module 1 comprises a double-loop plug 16 which loops unused slots on the back side of the pluggable module 1. In the embodiment as shown in FIG. 9F no front connectors are provided. The embodiments as shown in FIGS. 9F, 9G can be used for providing loops within a host device 2.

Figure 9H:
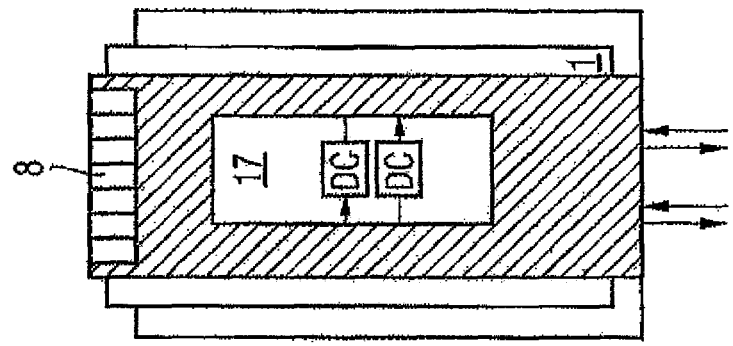
Figure 9:
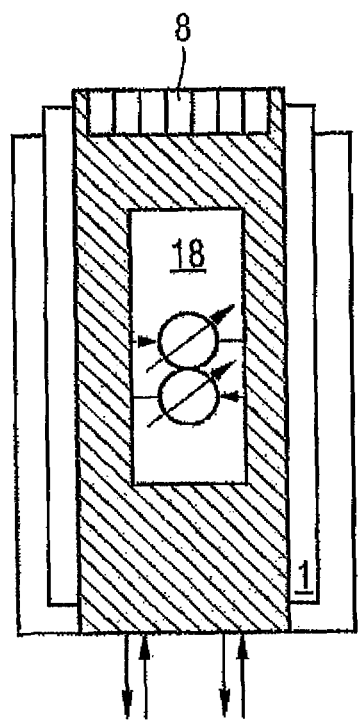
Figure 9:
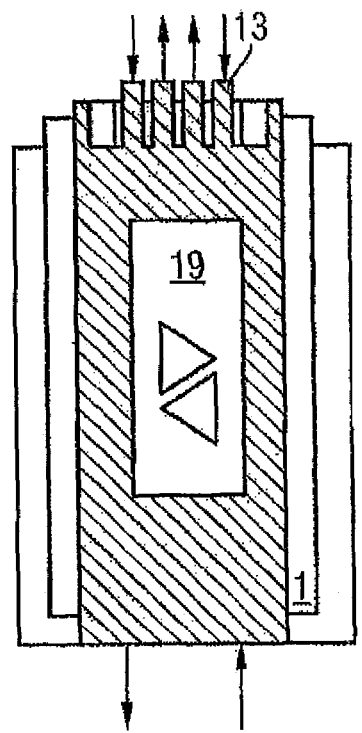
Figure 20:
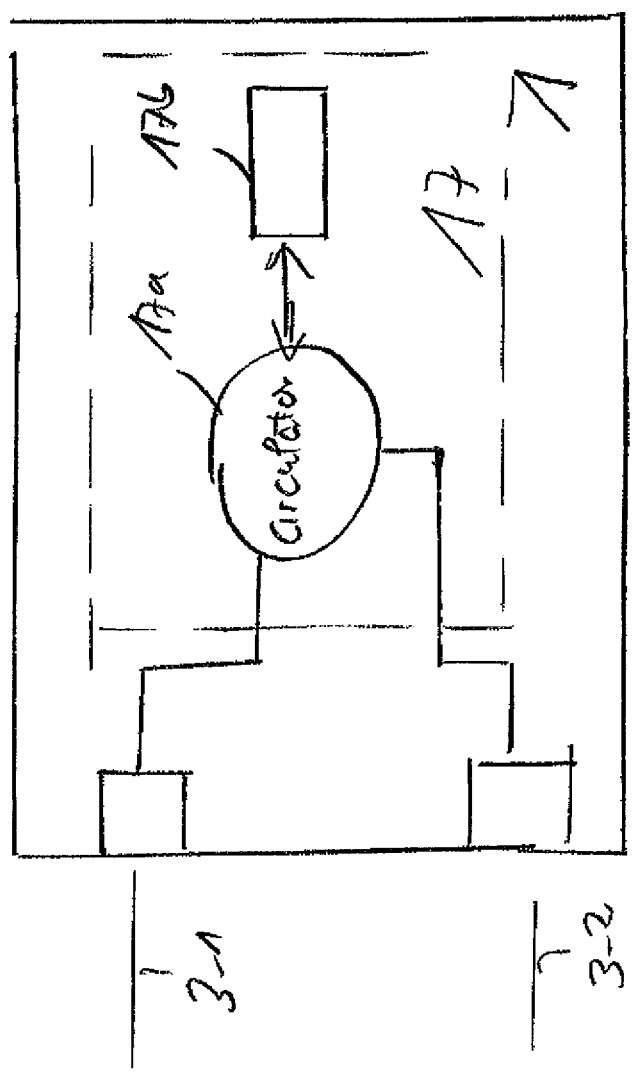
FIG. 20 shows a diagram of a possible embodiment of a pluggable module according to the present invention.

FIG. 9H shows a further embodiment of a pluggable module 1 according to the present invention. In the shown embodiment, the pluggable module 1 comprises a dispersion compensation plug 17. The dispersion compensation plug 17 can be either unidirectional or bidirectional. FIG. 9H shows a bidirectional dispersion compensation plug 17 within the pluggable module 1. The dispersion compensation unit DC can be, for example formed by a fibre bragg grating. FIG. 20 shows a pluggable module 1 forming a dispersion compensation plug 17 in more detail.

FIG. 9I shows a further embodiment of the pluggable module 1 according to the present invention. In the embodiment as shown in FIG. 9F the pluggable module 1 is formed by a variable optical attenuator VOA 18. The variable optical attenuator 18 can be either unidirectional or bidirectional. FIG. 9I shows a bidirectional variable optical attenuator 18. In a possible embodiment all WDM channels of a received optical signal are alternated with an attenuation factor <1 to reduce the amplitudes of the respective WDM channels. In an alternative embodiment each WDM channel can be attenuated by a separate adjustable attenuation factor which can be set in a possible embodiment via the electrical host interface 8.

FIG. 9J shows in a further embodiment of the pluggable module 1 according to the present invention. In the shown embodiment the pluggable module 1 comprises a power splitter 19. The power splitter 19 can be either unidirectional or bidirectional. FIG. 9J shows a unidirectional power splitter. In the given example of FIG. 9J the pluggable module 1 comprises six ports, for example port 1 may have 100%, port 5 x %, port 2 100−x % of the power and port 3, 6, 4 may have an identical signal but with other direction. A pluggable module 1 with a power splitting unit 35 is also explained with reference to FIG. 22.

Figure 10:
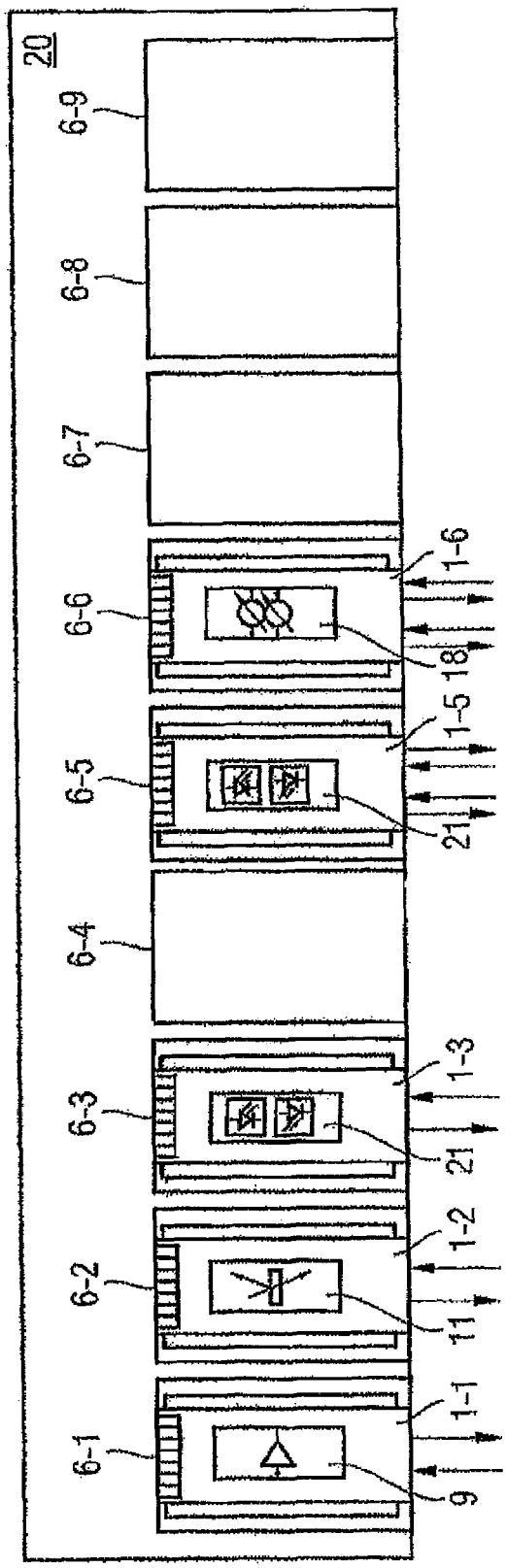
FIG. 10 shows an embodiment of an interface card as employed by a host device according to a possible embodiment of the present invention.

The host device 2 as shown in FIG. 6 may comprise in a possible embodiment an optical interface card 20 for several pluggable modules 1 according to the present invention as shown in FIG. 10. In the given example of FIG. 10, different pluggable modules 1 are plugged into a corresponding cage 6 of the interface card 20 of a host device 2. The interface card 20 comprises in the given example nine cages 6-1 to 6-9 each provided for receiving a corresponding pluggable module 1. In the given example of FIG. 10 the pluggable modules 1-1, 1-2, 1-3, 1-5 and 1-6 are plugged into the corresponding cages 6 of the interface card 20. In the given example the pluggable module 1-1 comprises an unidirectional amplifier 9, the second pluggable module 1-2 comprises a blocking filter 11 and the third pluggable module 1-3 is formed by a transceiver 21. The pluggable module 1-5 is also formed by a transceiver and the pluggable module 1-6 shown in FIG. 10 is formed by a variable optical attenuator VOA 18. The cages 6-4, 6-7, 6-8, 6-9 of the cartridge 20 are empty in the given example of FIG. 10.

Figure 11:
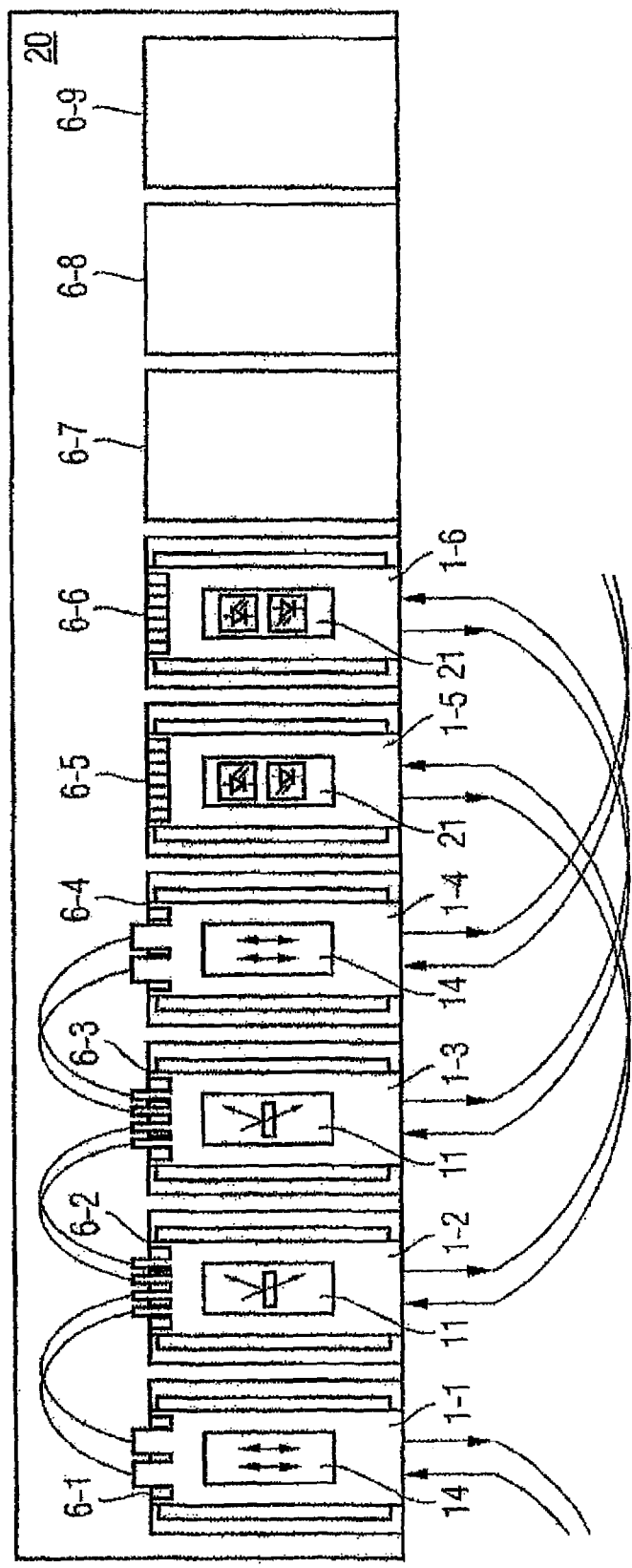
FIG. 11 shows an interface card of a host device with plugged in modules according to the present invention.

FIG. 11 shows a further example of a interface card 20 showing two wave lengths OADM. In the given example the first six cages 6-1 to 6-6 of the interface card 20 are occupied by plugged in pluggable modules 1-1 to 1-6. In the given example the first pluggable module 1-1 comprises a connector plug 14, the second pluggable module 1-2 comprises a blocking filter 11, the third pluggable module 1-3 comprises also a blocking filter 11, the fourth pluggable module 1-4 comprises a connector plug 14, the fifth pluggable module 1-5 is formed by a transceiver 21 and the sixth pluggable module 1-6 also comprises a transceiver 21.

Figure 12:
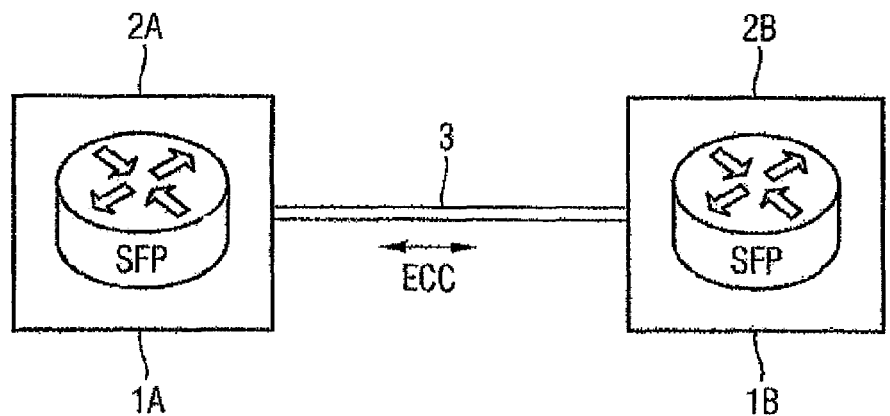
FIG. 12 shows a diagram for illustrating an embedded communication channel which is provided by a pluggable module according to an embodiment of the present invention.

In a preferred embodiment of the pluggable module 1 according to the present invention, the pluggable module 1 comprises an embedded communication channel ECC as illustrated by FIG. 12. The embedded communication channel ECC is provided between two pluggable modules 1A, 1B and is provided for exchanging management data, administrative data and performance monitoring data between the near end pluggable module 1A and a far end pluggable module 1B. In a possible embodiment the embedded communication channel ECC is implemented at a physical layer. The embedded communication channel ECC can be provided by amplitude shift keying (ASK), frequency shift keying (FSK) or phase shift keying (PSK). In a possible embodiment the embedded communication channel ECC is provided by side band modulation of a data signal of transported data. In a possible embodiment the data signal is pulse amplitude modulated.

In a further embodiment the embedded communication channel ECC between the pluggable modules 1A, 1B is implemented at a protocol layer. In a possible embodiment the embedded communication channel ECC uses a bandwidth not occupied by a transport protocol for exchanging data between the near end pluggable module 1A and a far end pluggable module 1B. In a possible embodiment the embedded communication channel ECC is implemented on a proprietary overhead that is generated on top of a transport protocol. In a further embodiment the embedded communication channel ECC can be implemented based on the overhead of a transport protocol, such as idle data patterns in inter-frame gaps. The embedded communication channel ECC can be implemented within a protocol layer, such as an Ethernet protocol. The embedded communication channel ECC can use existing protocol overheads or space in inter-frame gaps which can be implemented inside a protocol layer, such as EFM (Ethernet First Mile). The mapping/demapping of data within the embedded communication channel ECC is performed within the pluggable module 1A, 1B.

The purpose of the provided embedded communication channel ECC is to read performance monitoring data from the far end side, write PM-data to the far end side and to perform topology detection within the network of pluggable modules 1. The embedded communication channel ECC can be provided to read communication data from the far end side and to report to an internal controller of the near end pluggable module 1. With the embedded communication channel ECC it is further possible to write configuration data to the far end pluggable module controller and to allow communication between a near end host device 2A and a far end host device 2B as shown in FIG. 11.

The provision of an embedded communication channel ECC allows remote reporting of diagnostic parameters, such as DMI. Furthermore, it is possible to make remote diagnostics parameters permanently available at a remote side, for example power local, power remote. By using standard SFF 8472 digital diagnostics I/F, it is possible to latch remote data, i.e. store the data in a memory of the pluggable module 1.

There are two main possibilities for implementation of the embedded communication channel ECC. In a physical layer implementation of the embedded communication channel ECC, for example a pilot tone can be used. By using, for example a slow AM modulation scheme (10%, KHz range) available diagnostic I/F data can be imprinted on the embedded communication channel ECC.

In an alternative embodiment, the embedded communication channel ECC can be implemented on a protocol layer. For example, the embedded communication channel ECC can be provided on top of a service protocol. In a possible embodiment, a high speed capable integrated circuit can be provided in a data path to imprint the embedded communication channel ECC. Imprinting of the embedded communication channel ECC can, for example use of inter-frame gaps for creation of an overhead OH. The available digital diagnostic I/F data can be imprinted or transferred on the embedded communication channel ECC.

Figure 13:
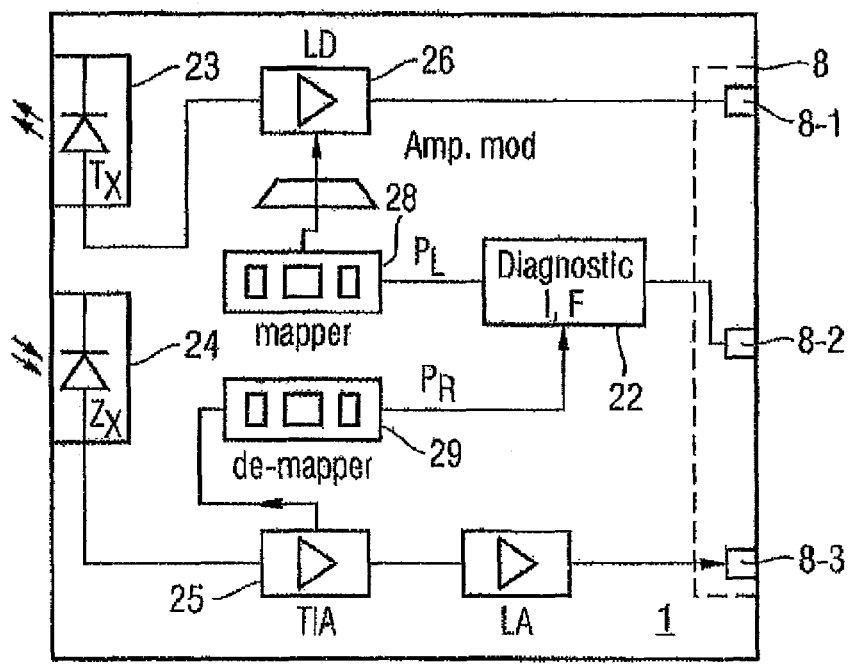
FIG. 13 shows a block diagram of a possible embodiment of a pluggable module according to the present invention.

FIG. 13 shows a possible embodiment for the pluggable module 1 comprising an embedded communication channel ECC. In the shown embodiment, the pluggable module 1 comprises a diagnostic unit 22 to receive local performance data and electronic components within the pluggable module 1. These electronic components comprise in the given example a transmission diode 23, a receiving diode 24, a transimpedance amplifier TIA 25, a laser driver 26 and a limiting or linear amplifier 27. On the backside of the pluggable module 1 the electrical interface 8 comprises a data transmission interface 8-1, an electrical reporting interface 8-2 and for the reception data path an electrical data reception interface 8-3. Furthermore, the pluggable module 1 comprises a mapping unit 28 which controls the laser driver 26 depending on local performance data received from the diagnostic unit 22 to transfer the performance data via the provided embedded communication channel ECC to a remote pluggable module 1.

As can be seen from FIG. 13, the pluggable module 1 further comprises a demapping unit 29 for storing performance data extracted from the embedded communication channel ECC in a memory of the diagnostic unit 22. The performance data can be extracted, for example at the transimpedance amplifier 25 and the embedded communication channel ECC can be provided by side band modulation of a data signal of the transported data stream. The diagnostic unit 22 receives local performance data from the electronic components 23, 24, 25, 26, 27, such as temperature T or power consumption P. In a possible embodiment, the diagnostic unit 22 reports the received local (near end) performance data and the received remote (far end) performance data transported via the embedded communication channel ECC via the electrical interface 8-2 to a controlling device of the host device 2 into which the pluggable module 1 is inserted. The electrical interface 8-2 can be formed in a possible embodiment by an $I^2C$ bus. In a possible embodiment, the performance data extracted at the transimpedance amplifier TIA comprises SFF 8472-performance parameters. In a possible embodiment, the diagnostic unit 22 comprises a memory for storing local performance data of the pluggable module 1 as well as the received and extracted performance data of remote pluggable modules.

Figure 14:
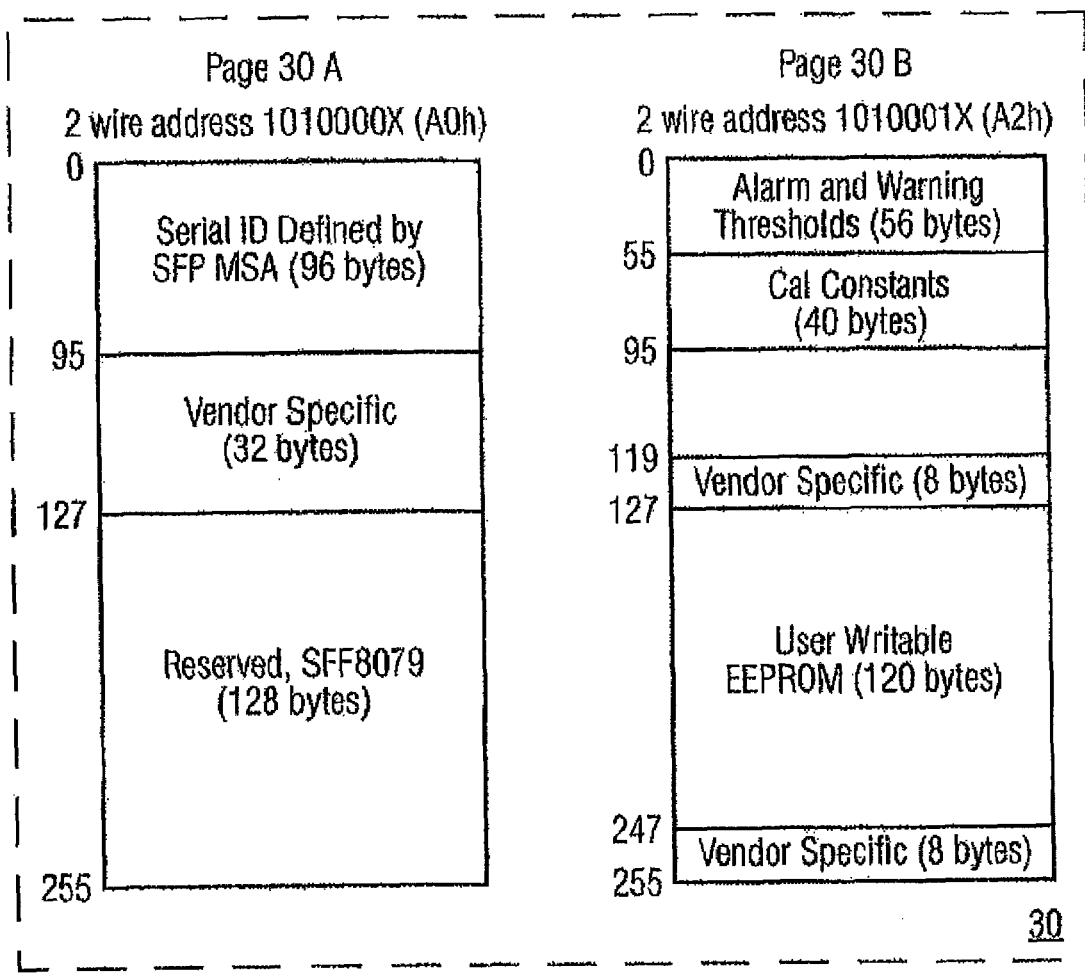
FIG. 14 shows a data structure of a memory within a pluggable module according to a possible embodiment of the present invention.

FIG. 14 shows schematically a memory content of a memory 30 within the diagnostic unit 22 as shown in FIG. 13. In the shown embodiment, the memory 30 is a SSF 8472-memory having a page 30A and a page 30B. As can be seen from FIG. 14, in the SSF 8472-memory unallocated bytes on page 3013 are used for exchanging DMI (digital monitoring interface) performance data with a far end pluggable module 1. This memory space can be used for transferring data from the diagnostic unit 22 to the respective host device 2.

FIG. 15 shows the memory space page 30B for storing real time diagnostic interface data in more detail. Data bytes 96-105 are used for local near end parameter data. As can be seen from FIG. 15 data bytes 106-109 are unallocated data which can be used for transferring data via the embedded communication channel ECC to a far end pluggable module. In a possible embodiment, the parameter data is refreshed in a fixed time period interval, such as every five seconds.

As can be seen from FIG. 13, the mapping and demapping units 28, 29 are connected to a SFF 8472-diagnostic unit. The near end SSF 8472-data is read and written into the embedded communication channel ECC by the mapping unit 28. The embedded communication channel ECC is read and the far end SFF 8472-parameter data is extracted and written to the near end SFF 8472-unit 22. The data is written to a diagnostic SSF 8472-unit 22 which supports SSF 8472 programming pages, so that address space extensions can be avoided to prevent adaptions of the hardware and software of the host device 2. To meet space constraints within the SSF 8472-address space a proprietary TDM-mapping scheme can be supported to map such data sets into the address space.

In a possible embodiment of the pluggable module 1 according to the present invention, the pluggable module 1 performs near end and far end bidirectional performance monitoring.

FIGS. 16A, 16B show embodiments employing parallel processing using SERDES (serial/deserializer). FIGS. 16C, 16D show embodiments of the pluggable module 1 employing serial processing using high speed FPGA-interfaces. As can be seen from FIG. 16A, a SERDES (serial/deserializer) 31 is provided for supplying data from a transmit data path to data processing circuit 32 such as a field programmable gate array. The data processing circuit 32 can also be formed by an ASIC, EPLD or CPLD. A further SERDES (serial/deserializer) 33 is provided for supplying data from a reception data path of said pluggable module 1 to the FPGA 32. The digital performance monitoring is provided for observing data streams. The SERDES 31, 33 are provided for parallizing a high speed signal into a number of low speed data streams.

In the embodiments shown in FIGS. 16C, 16D the SERDES 31, 33 are incorporated in the FPGA 32. In the embodiment shown in FIG. 16A the SERDES 31, 33 are provided within the data path and have high speed in- and out-interfaces for the local speed data streams. In the embodiment as shown in FIG. 16B the SERDES 31 has a high speed in-interface for a signal which is forwarded as a low speed data stream to the FPGA 32. The FPGA 32 as shown in FIGS. 16A, 16B is provided for performing performance monitoring. The FPGA 32 is connected to the diagnostic unit 22 of the pluggable module 1. In a possible embodiment, the FPGA 32 increments at least one performance counter provided in a memory 30 of the diagnostic unit 22 depending on a measured performance indicator. In a possible embodiment, the performance indicator can be formed by a BER (bit error rate), a CV (coding violation) or by frame drops.

Figure 17A:
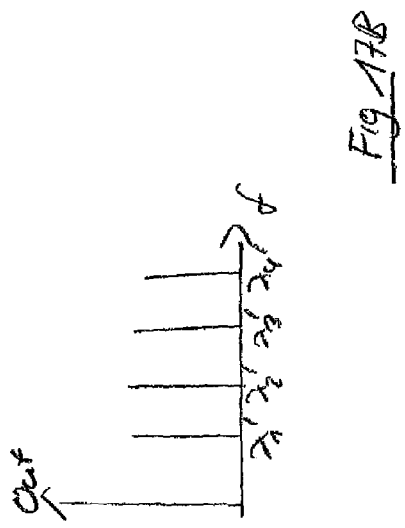
FIG. 17A-17D show uni- and bidirectional optical amplifiers and corresponding signal spectra for illustration of possible embodiments of the pluggable module as employed by the network according to the present invention.
Figure 17B:
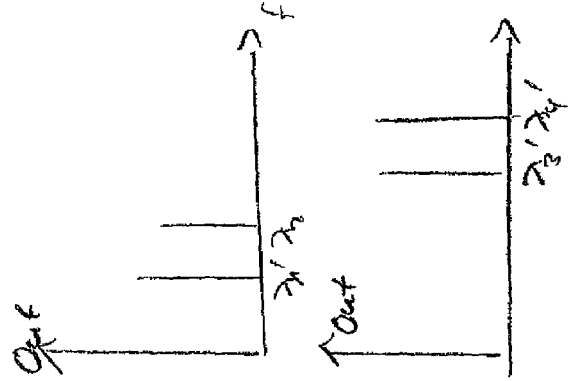

FIG. 17A shows an unidirectional optical amplifier integrated into a pluggable module 1 according to the present invention. The signal amplifier 9 receives in the given example on a first optical fibre 3-1 optical data signals via different WDM-channels at different wavelength λ1, λ2, λ3, λ4 and amplifies the received optical signal in the optical domain. The amplified signal is output via a second optical fibre 3-2 wherein the amplitude of each WDM-Signal is higher than the corresponding original signal transported via the first optical fibre 3-1. In a possible embodiment an amplification factor α is adjustable can be programmed via the host interface 8. In a possible embodiment all optical signals are amplified in the optical domain with the same identification factor α. In an alternative embodiment different amplification factors α can be set or programmed for the different WDM-channels. The amplification factor α is higher than 1 (α>1). In an alternative embodiment the pluggable module 1 comprises an optical attenuator with an attenuation factor β<1.

Figure 17C:
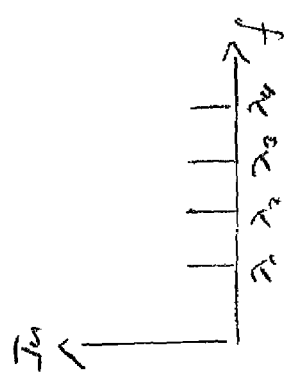
Figure 17D:
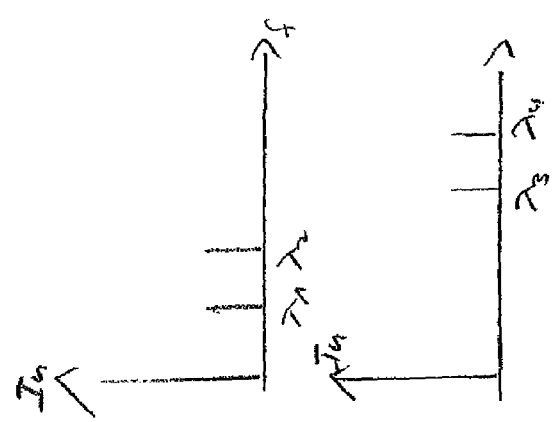

FIG. 17C shows an bidirectional optical amplifier as a possible embodiment of a pluggable module 1 according to the present invention. In the given embodiment the optical WDM-Signal is transported in both directions on both optical fibre 3-1, 3-2. In the given example the pluggable module 1 receives via a first optical fibre 3-1 a WDM-Signal having wavelength λ1, λ2 and amplifies the signal in both WDM-channels in the optical domains as shown in the signal spectrum of FIG. 17D. The amplified signal is output via the second optical fibre 3-2. In the same manner the pluggable module 1 receives via the second optical fibre 3-2 a second optical WDM-Signal having two different WDM-channels λ3, λ4, amplifies this signal in the optical domain and outputs the signal with amplified amplitudes via the first optical fibre 3-1.

Figure 18:
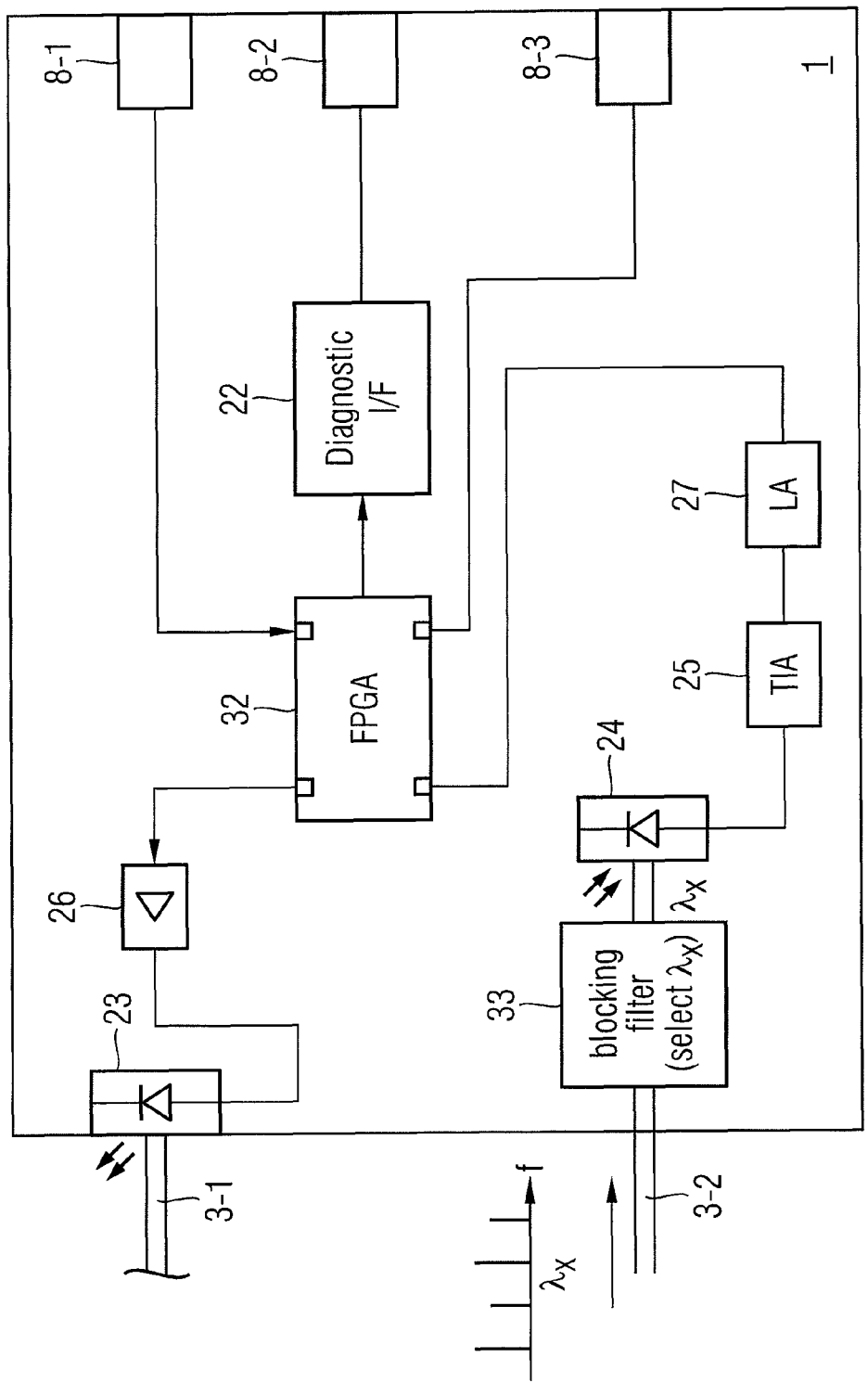
FIG. 18 shows a block diagram of a possible embodiment of a pluggable module according to the present invention.

FIG. 18 shows a block diagram of a further embodiment of a pluggable module 1 as employed by the network according to the present invention. In the given example, the pluggable module 1 receives a WDM-optical signal via an optical fibre 3-2. In the pluggable module 1 according to the present invention as shown in FIG. 18 a blocking filter 33 is provided. In the shown embodiment the blocking filter 33 blocks all WDM-channels with the exception of one wavelength λx. Accordingly, one wavelength λx i.e. one WDM-channel reaches the photo diode 24 for further processing. In a possible embodiment the blocking filter blocks all WDM-channels with the exception of a predetermined number a group of WDM-channels. The selected WDM-channel can be processed in the pluggable module 1 or by a processing unit of the corresponding host device 2. The number of WDM-channels transported via an optical fibre 3 within the network according to the present invention can vary. In dense WDM (DWDM) the number of WDM-channels can be up to 160. In coarse WDM (CWDM) the number of WDM-channels is lower and can comprise up to 18 channels. In a possible embodiment the blocking filter 33 is programmable via the host interface 8. In a possible embodiment the WDM-channels which are passed through by the blocking filter can be set via the host interface 8. In the embodiment shown in FIG. 18 the blocking filter 33 blocks all WDM-channels with the exception of a predetermined group of WDM-channels. In an alternative embodiment the blocking filter 33 blocks only a predetermined group of WDM-channels and passes all remaining WDM-channels to the photodiode 24 within the pluggable module 1.

Figure 19A:
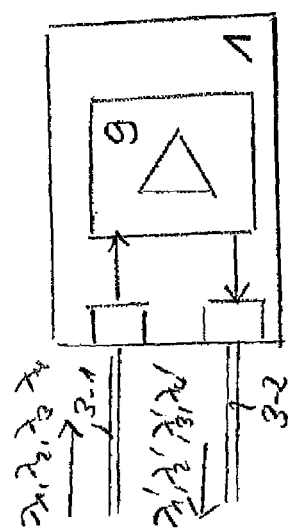
FIG. 19 shows an example for wiring pluggable modules according to the present inventions.
Figure 19B:
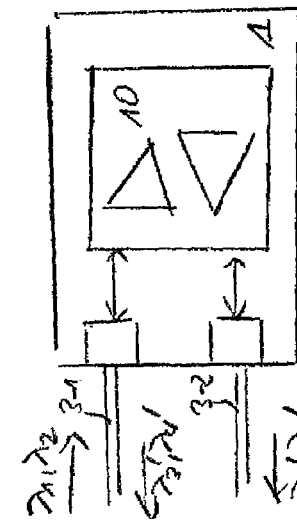

FIG. 19 shows an example for wiring different pluggable modules 1 according to the present invention in a network. In the given example of FIG. 19 the first pluggable module 1A receives a WDM-signal via a first optical fibre 3-1 comprising four WDM-channels with four wavelength $\lambda 1$, $\lambda 2$, $\lambda 3$, $\lambda 4$. A blocking filter 33 within the first pluggable module 1A blocks the first WDM-channel with a first wavelength $\lambda 1$ as shown in FIG. 19. The filtered optical signal is forwarded by the pluggable module 1A via a second optical fibre 3-2 to a second pluggable module 1B. A blocking filter within the second pluggable module 1B blocks in the given example the third WDM-channel with wavelength $\lambda 3$ and forwards the filtered optical signal via a third optical fibre 3-3 to a third pluggable module 1C receiving only two WDM-channels at wavelength $\lambda 2$, $\lambda 4$.

FIG. 20 shows a further embodiment for a pluggable module 1 as employed within the network according to the present invention. In the embodiment shown in FIG. 20 the pluggable module 1 comprises an integrated dispersion compensation unit 17. The dispersion compensation unit 17 comprises a circulator 17a and a fiber bragg grating 17b. The optical signal received via a first optical fibre 3-1 is supplied via the circulator 17a to the fiber bragg grating which reflects the optical signal back to the circulator 17a wherein the reflected optical signal is output by the circulator 17a via the second optical fibre 3-2 to a far and pluggable module. The dispersion compensation unit 17 compensates delays which are caused by the optical fibres and makes it possible to regenerate signal impulses of optical signals within the network. The pluggable module 1 as shown in FIG. 20 comprising a dispersion compensation unit 17 can be provided for an optical regeneration of signals within the network.

FIGS. 21A, 21B show further embodiments of a pluggable module 1 as employed within the network according to the present invention.

FIG. 21A shows a pluggable module 1 with an integrated optical switch 34 which in a possible embodiment is controlled via the host interface 8 by the corresponding host device 2. When the optical switch 34 is closed, an optical signal received via a first optical fibre 3-1 is forwarded by the pluggable module 1 to a second optical fibre 3-2. In the embodiment shown in FIG. 21A if the optical switch 34 is not closed the received optical signal is blocked.

FIG. 21B shows a further embodiment of a pluggable module 1 with integrated optical switch. The pluggable module 1 is connected on the front side to two optical fibres 3-1, 3-2 and on the backside via a further optical fibre 3-3 to the backplane of the respective host device 2. In a possible embodiment the optical switch 34 can be controlled by the host device 2 via an electrical interface 8. For example an optical signal received via the first optical fibre 3-1 can be either switched to the backplane, i.e. to the optical fibre 3-3 or back to frontplane, i.e. to the optical fibre 3-2.

FIG. 22 shows a further embodiment of a pluggable module 1 as employed by the network according to the present invention. In this embodiment the pluggable module 1 comprises an integrated optical power splitter 35. In the given example the optical power splitter 35 is integrated in the pluggable module 1 and splits the power of an optical signal received via a first optical fibre 3-1 evenly. Accordingly an optical signal is output by the pluggable module 1 via an optical fibre 3-3 to the backplane and to the optical fibre 3-2 at the front side wherein e.g. 50% of the received optical power is output by means of an optical signal to the front side i.e. to optical fibre 3-2 and 50% of the received optical power is output to the backplane.

In a possible embodiment a power splitting ratio is adjustable by means of an electrical interface 8 of the pluggable module 1.

Figure 23B:
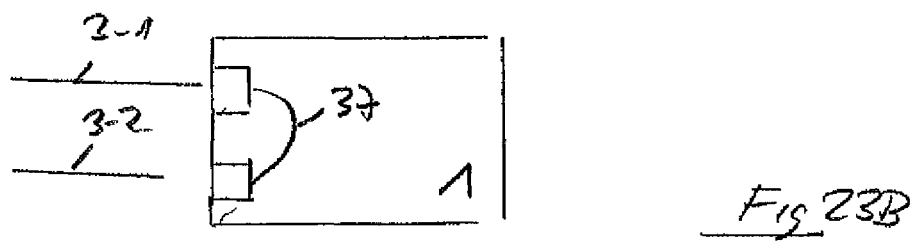
Figure 23C:
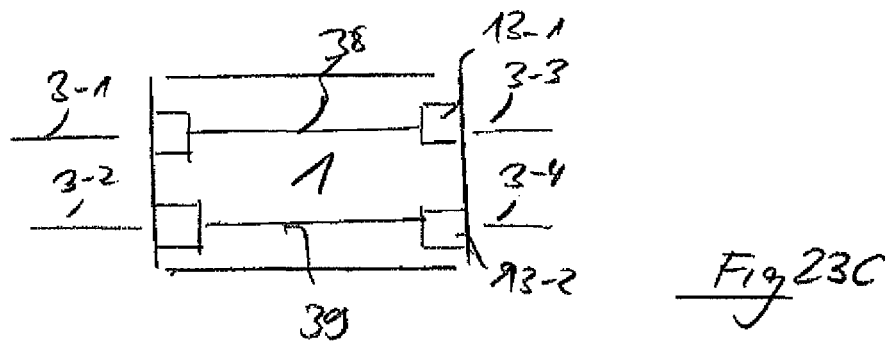

FIGS. 23A, 23B, 23C show further embodiments for pluggable modules 1 which can be employed by a network according to the present invention.

FIGS. 23A, 23B show pluggable modules with integrated optical loops. In the embodiment shown in FIG. 23A an integrated optical loop 36 is provided for two optical fibres 3-1, 3-2 provided on the backplane side of the pluggable module 1.

FIG. 23B shows an embodiment of a pluggable module comprising an integrated optical loop 37 connecting two optical fibres 3-1, 3-2 on the front side of the pluggable module 1.

FIG. 23C shows a further embodiment of a pluggable module 1 as employed by the network according to the present invention. In the given exemplary embodiment the pluggable module 1 comprises a first integrated optical connection 38 and a second optical connection 39 wherein the first optical connection 38 connects an optical fibre 3-1 on the front side with another optical fibre 3-3 on the backplane side and wherein the second optical connection 39 connects an optical fibre 3-2 on the front side with a further optical fibre 3-4 on the backplane side of the pluggable module. The pluggable modules 1 as shown in FIGS. 23A, 23B, 23C facilitate a possible wiring of different pluggable modules according to the needs of the user.

FIG. 24 shows a simple example for wiring different pluggable modules 1. In the given example a first pluggable module 1A comprises a blocking filter which blocks all WDM-channels of a received optical signal with the exception of the WDM-channel with the wavelength $\lambda 3$. The filtered optical signal is forwarded by a second optical fibre 3-2 at the backplane. At the backplane the filtered optical signal is looped to the front side by means of a second pluggable module 1B having a structure as shown in FIG. 23C. The optical signal as shown is forwarded via a third optical fibre 3-3 to a third pluggable module 1C comprising for example a transceiver.

Pluggable modules 1 as employed by a network according to the present invention comply with a multisource agreement (MSA) such as X2, GBIC, xenpack, XFP and SFP. These multisource agreements MSA define modules which can be plugged in to larger units such as host devices which are typically vendor specific, i.e. not governed by any multisource agreement. These larger units can have a dual, i.e. transmit and receive, optical connection at the front side, i.e. the side accessible when the pluggable module is plugged into the larger unit, and an electrical connection at the backside, i.e. the side opposing the front side, for power and control connectors.

Signal processing devices integrated into the pluggable module 1 according to the present invention further comply with the predetermined power limitations as laid down in the multisource agreements. The network according to the present invention allows a high density of optical interfaces and a connection of different host devices by providing compatibility. In a possible embodiment of the pluggable module 1 as employed by the network according to the present invention optical connectors for connecting optical fibres are not only provided on the front side of the pluggable module 1 but also on the backside, i.e. at the side of the backplane of the respective host device 2. In a possible embodiment the pluggable modules comprise blocking filters or OADM filters which provide an add drop functionality.

The ADM-functionality of the pluggable module 1 according to the present invention allows to connect host devices 2 in a multiple node-star-network according to a so-called PON-structure that shares a common optical fibre infrastructure. The pluggable module 1 according to the present invention, with the TDMA-function allows to connect a plurality of devices over a PON-infrastructure for additional active data transport devices. The host device 2 can comprise a standard transceiver port. The host device 2 receives an Ethernet data stream with a data throughput which is a fraction of the complete Ethernet bandwidth. In a possible embodiment, the configuration of the bandwidth is performed automatically within the TDMA. In an alternative embodiment, the configuration is performed by transferring configuration parameters.

The pluggable module 1 according to the present invention performs in a possible embodiment an optical amplification or optical attenuation, optical test functions and an optical dispersion compensation. With this functionality it is possible to connect host devices 2 in an optical network comprising sophisticated optical functions like wavelength division multiplexing (WDM) over longer distances between termination nodes that require a power level and dispersion management. The pluggable module 1 according to the present invention performs in an embodiment a monitoring and a manipulation of optical signals.

What is claimed is:

1. A network comprising:
at least one host device having an interface card connected to a backplane of said host device,
wherein said interface card comprises at least one cage for receiving a pluggable module;
wherein said pluggable module performs signal processing of data comprised of at least one wavelength division multiplexed (WDM) channel transported via at least one optical fibre connected to said pluggable module in the optical domain,
wherein said pluggable module performs as well traffic management of the data,
wherein said traffic management of the data is performed within the pluggable module either in the electrical domain or in the optical domain;
wherein said pluggable module comprises at least one of an optical blocking filter, an optical add drop multiplexer filter, a variable optical attenuator, a bidirectional optical amplifier, an optical switching device, a dispersion compensation unit, an optical power splitter, an optical loop device, and an optical connection device.

2. The network according to claim 1, wherein said pluggable module is a MSA compatible module, comprising a SFP-module, a XFP-module, a GBIC-module, or a XFN Pack-module.

3. The network according to claim 1, wherein said host devices comprise switching devices and optical transport devices.

4. The network according to claim 3, wherein said switching devices comprise router, bridges, Ethernet switches and fibre channel switches.

5. The network according to claim 3, wherein said optical transport devices comprise SDH-, SONET-, PDH-, OTH-, Ethernet, Fibre Channel, FICON and uncompressed video transport devices.

6. The network according to claim 1, wherein said pluggable module performs monitoring and manipulation of optical signals.

7. A pluggable module for transport of wavelength division multiplexed (WDM) data via at least one optical fibre between host devices,
wherein said pluggable module is adapted to be pluggable into a corresponding cage of one of said host devices and performs signal processing of said data comprised of at least one WDM channel in the optical domain,
wherein said pluggable module performs as well traffic management of the data,
wherein said traffic management of the data is performed within the pluggable module either in the electrical domain or in the optical domain, and
wherein said pluggable module comprises at least one of an optical blocking filter, an optical add drop multiplexer filter, a variable optical attenuator, a bidirectional optical amplifier, an optical switching device, a dispersion compensation unit, an optical power splitter, an optical loop device, and an optical connection device.

8. The pluggable module according to claim 7, wherein said pluggable module is a MSA compatible pluggable module comprising an SFP-module, a XFP-module, a GBIC-module and a XFN Pack-module.

9. An interface card for a host device comprising at least one cage for receiving a pluggable module according to claim 7.

10. A host device comprising at least one interface card according to claim 9, connected to a backplane of said host device.

11. A data transport system for transporting wavelength division multiplexed (WDM) data via at least one optical fibre, comprising:
a pluggable module provided at one or both ends of said optical fibre;
wherein said pluggable module performs signal processing of said data transported via said optical fibre in the optical domain,
wherein said pluggable module performs as well traffic management of the data,
wherein said traffic management of the data is performed within the pluggable module either in the electrical domain or in the optical domain, and
wherein said pluggable module comprises at least one of an optical blocking filter, an optical add drop multiplexer filter, a variable optical attenuator, a bidirectional optical amplifier, an optical switching device, a dispersion compensation unit, an optical power splitter, an optical loop device, and an optical connection device.

12. A method for transporting wavelength division multiplexed (WDM) data between host devices of a network via at least one optical fibre, comprising:

performing signal processing of the data comprising at least one WDM channel by a plugged in module in the optical domain, wherein a pluggable module attached to said optical fibre is plugged into a corresponding cage of one of said host devices, wherein said pluggable module performs as well traffic management of the data, wherein said traffic management of the data is performed within the pluggable module either in the electrical domain or in the optical domain, and wherein said pluggable module comprises at least one of an optical blocking filter, an optical add drop multiplexer filter, a variable optical attenuator, a bidirectional optical amplifier, an optical switching device, a dispersion compensation unit, an optical power splitter, an optical loop device, and an optical connection device.

13. A computer program product comprising a non-transitory computer readable storage medium having instructions embodied therein for performing the method according to claim 12, the instructions including control logic for causing a computer to transport wavelength division multiplexed data between host devices of a network via at least one optical fibre, the control logic comprising:

first computer readable program code means for performing signal processing of the dat comprising at least one WDM channel by a plugged in module in the optical domain, wherein a pluggable module attached to said optical fibre is plugged into a corresponding cage of one of said host devices, wherein said pluggable module performs as well traffic management of the data, wherein said traffic management of the data is performed within the pluggable module either in the electrical domain or in the optical domain, and wherein said pluggable module comprises at least one of an optical blocking filter, an optical add drop multiplexer filter, a variable optical attenuator, a bidirectional optical amplifier, an optical switching device, a dispersion compensation unit, an optical power splitter, an optical loop device, and an optical connection device.

* * * * *